US008988443B2

(12) United States Patent
Croxford et al.

(10) Patent No.: US 8,988,443 B2
(45) Date of Patent: Mar. 24, 2015

(54) METHODS OF AND APPARATUS FOR CONTROLLING THE READING OF ARRAYS OF DATA FROM MEMORY

(75) Inventors: Daren Croxford, Cambridge (GB); Lars Ericsson, Cambridge (GB); Jon Erik Oterhals, Trondheim (NO)

(73) Assignee: ARM Limited, Cambridge (GB)

( * ) Notice: Subject to any disclaimer, the term of this patent is extended or adjusted under 35 U.S.C. 154(b) by 1112 days.

(21) Appl. No.: 12/923,517

(22) Filed: Sep. 24, 2010

(65) Prior Publication Data

US 2011/0080419 A1 Apr. 7, 2011

Related U.S. Application Data

(63) Continuation-in-part of application No. 12/588,459, filed on Oct. 15, 2009.

(30) Foreign Application Priority Data

Sep. 25, 2009 (GB) .................................. 0916924.4
Sep. 2, 2010 (GB) .................................. 1014602.5

(51) Int. Cl.
*G09G 5/36* (2006.01)
*G06T 1/60* (2006.01)
(Continued)

(52) U.S. Cl.
CPC ................ *G09G 5/393* (2013.01); *G09G 5/395* (2013.01); *G09G 2310/04* (2013.01); *G09G 5/363* (2013.01); *G09G 2330/021* (2013.01); *G09G 2350/00* (2013.01); *G09G 2360/122* (2013.01);

(Continued)

(58) Field of Classification Search
CPC ......................... G09G 5/36–5/366; G06T 1/60
USPC .................................................. 345/530, 545
See application file for complete search history.

(56) References Cited

U.S. PATENT DOCUMENTS 5,181,131 A 1/1993 Yamazaki et al.
5,241,656 A 8/1993 Loucks et al.
(Continued)

FOREIGN PATENT DOCUMENTS

CN 1834890 9/2006
CN 101116341 1/2008
(Continued)

OTHER PUBLICATIONS

U.S. Appl. No. 12/588,459, filed Oct. 15, 2009; Inventor: Oterhals et al.

(Continued)

*Primary Examiner* — Jacinta M Crawford
(74) *Attorney, Agent, or Firm* — Nixon & Vanderhye P.C.

(57) ABSTRACT

A display controller reads blocks of data from a frame buffer and stores them in a local memory buffer of the display controller before outputting the blocks of data to a display. The display controller uses similarity meta-data associated with the output frame in the frame buffer to determine whether a new block of data to be processed for display is similar to a block of data already stored in the local memory of the display controller or not. If it is determined that the data block to be processed is similar to a data block already stored in the local buffer of the display controller, the display controller does not read a new data block from the frame buffer but instead provides the existing data block in its buffer to the display.

27 Claims, 11 Drawing Sheets

(51) Int. Cl.
*G09G 5/395* (2006.01)
*G09G 5/393* (2006.01)

(52) U.S. Cl.
CPC .... *G09G 2320/103* (2013.01); *G09G 2360/121* (2013.01)
USPC .......................................... 345/545; 345/530

(56) References Cited

U.S. PATENT DOCUMENTS

| | | | |
|---|---|---|---|
| 5,686,934 | A | 11/1997 | Nonoshita et al. |
| 6,069,611 | A | 5/2000 | Flynn et al. |
| 6,075,523 | A | 6/2000 | Simmers |
| 6,094,203 | A | 7/2000 | Desormeaux |
| 6,101,222 | A | 8/2000 | Dorricott |
| 6,304,606 | B1 | 10/2001 | Murashita et al. |
| 6,825,847 | B1 | 11/2004 | Molnar et al. |
| 7,671,873 | B1 | 3/2010 | Pierini et al. |
| 8,749,711 | B2 | 6/2014 | Um |
| 2002/0036616 | A1 | 3/2002 | Inoue |
| 2003/0080971 | A1 | 5/2003 | Hochmuth et al. |
| 2005/0168471 | A1 | 8/2005 | Paquette |
| 2005/0285867 | A1 | 12/2005 | Brunner et al. |
| 2006/0050976 | A1 | 3/2006 | Molloy |
| 2006/0152515 | A1 | 7/2006 | Lee et al. |
| 2006/0188236 | A1 | 8/2006 | Kitagawa |
| 2006/0203283 | A1 | 9/2006 | Fujimoto |
| 2007/0005890 | A1 | 1/2007 | Gabel et al. |
| 2007/0083815 | A1 | 4/2007 | Delorme et al. |
| 2007/0146380 | A1 | 6/2007 | Nystad et al. |
| 2007/0188506 | A1 | 8/2007 | Hollevoet et al. |
| 2007/0257925 | A1 | 11/2007 | Brunner et al. |
| 2007/0261096 | A1 | 11/2007 | Lin et al. |
| 2007/0273787 | A1 | 11/2007 | Ogino et al. |
| 2008/0002894 | A1 | 1/2008 | Hayon et al. |
| 2008/0059581 | A1 | 3/2008 | Pepperell |
| 2008/0143695 | A1 | 6/2008 | Juenemann et al. |
| 2009/0033670 | A1 | 2/2009 | Hochmuth et al. |
| 2010/0058229 | A1 | 3/2010 | Mercer |
| 2011/0074765 | A1 | 3/2011 | Oterhals et al. |
| 2012/0092451 | A1 | 4/2012 | Nystad et al. |
| 2012/0176386 | A1 | 7/2012 | Hutchins |
| 2012/0206461 | A1 | 8/2012 | Wyatt et al. |

FOREIGN PATENT DOCUMENTS

| | | | |
|---|---|---|---|
| EP | 1 035 536 | A2 | 9/2000 |
| EP | 1 484 737 | A1 | 12/2004 |
| JP | 63298485 | | 12/1988 |
| JP | 05266177 | A | 3/1992 |
| JP | 5-227476 | | 9/1993 |
| JP | 5-266177 | | 10/1993 |
| JP | 11-328441 | | 11/1999 |
| JP | 11355536 | | 12/1999 |
| JP | 2004-510270 | | 4/2004 |
| JP | 2005-1958991 | | 7/2005 |
| JP | 2006-268839 | | 10/2006 |
| JP | 2007-81760 | | 3/2007 |
| JP | 2007-531355 | | 11/2007 |
| WO | WO 02/27661 | A2 | 4/2002 |
| WO | WO 2005/055582 | A2 | 6/2005 |
| WO | WO 2008/026070 | | 3/2008 |

OTHER PUBLICATIONS

U.S. Appl. No. 12/923,518, filed Sep. 24, 2010; Inventor: Oterhals et al.
Office Action mailed Aug. 29, 2012 in U.S. Appl. No. 12/588,459.
Office Action mailed Feb. 21, 2012 in U.S. Appl. No. 12/588,459.
Office Action mailed Aug. 30, 2012 in U.S. Appl. No. 12/588,461.
Office Action mailed Feb. 17, 2012 in U.S. Appl. No. 12/588,461.
Office Action mailed Jan. 22, 2013 in U.S. Appl. No. 12/588,459.
U.S. Application No. 12/588,461, filed Oct. 15, 2009; Inventor: Stevens et al.
Combined Search and Examination Report, Jan. 26, 2011, in corresponding European Application No. GB1016162.8.
Combined Search and Examination Report, Jan. 26, 2011, in corresponding European Application No. GB1016165.1.
U.S. Appl. No. 13/898,510, filed May 21, 2013; Inventor: Croxford et al.
Office Action mailed Jul. 2, 2013 in U.S. Appl. No. 12/588,459.
Office Action mailed Jun. 20, 2013 in U.S. Appl. No. 12/588,459.
Office Action mailed Jun. 5, 2013 in U.S. Appl. No. 12/588,461.
Z. Ma et al., Frame Buffer Compression for Low-Power Video Coding, 2011 18$^{th}$ IEEE International Conference on Image Processing, 4 pages, Date of conference: Sep. 11-14, 2011.
R. Patel et al., Parallel Lossless Data Compression on the GPU, 2012 IEEE, 10 pages, In Proceedings of Innovative Parallel Computing (InPar '12). May 13-14, 2012. San Jose, California.
T.L. Bao Yng et al., Low Complexity, Lossless Frame Memory Compression Using Modified Hadamard Transform and Adaptive Golomb-Rice Coding, IADIS International Conference Computer Graphics and Visualization 2008, Jul. 15, 2008, pp. 89-96.
H. Shim et al., A Compressed Frame Buffer to Reduce Display Power Consumption in Mobile Systems, in Proceedings of ACM/IEEE Asia South Pacific Design Automation Conference, pp. 819-824, Jan. 27-30, 2004.
A.J. Penrose, Extending Lossless Image Compression, Technical Report No. 526, Dec. 2001, pp. 1-149.
M. Ferretti et al., A Parallel Pipelined Implementation of LOCO-I for JPEG-LS, 4 pages; Date of conference: Aug. 23-26, 2004.
Quick Look at the Texas Instruments TI OMAP 4470 CPU, Kindle Fire HD CPU, http://www.arctablet.com/blog/featured/quick-look-texas-instruments-ti-omap-4470-cpu; posted Sep. 6, 2012 in Archos Gen10 CPU TI OMAP TI OMAP 4470; 12 pages; Sep. 6, 2012.
Jbarnes' braindump :: Intel display controllers; Jan. 26, 2011; http://virtuousgeek.org/blog/index.php/jbarnes/2011/01/26/intel_display_controllers; 5 pages, Jan. 26, 2011.
M. Weinberger et al., The LOCO-I Lossless Image Compression Algorithm: Principles and Standardization into JPEG-LS, pp. 1-34; Published in: Image Processing, IEEE Transactions on . . . (vol. 8, Issue 8), Aug. 2000.
United Kingdom Search Report in United Kingdom Application No. GB0916924.4, Jan. 15, 2010.
Shim et al., *A Compressed Frame Buffer to Reduce Display Power Consumption in Mobile Systems, IEEE*, Asia and South Pacific Design Automation Conference (ASP-DAC'04) pp. 1-6, 2006.
Shim, *Low-Power LCE Display Systems*, School of Computer Science and Engineering, Seoul National University, Korea, 2006.
Chamoli, Deduplication—A Quick Tutorial, Aug. 8, 2008, http://thetoptenme.wordpress.com/2008/08/08/duplication-a-quick-tutorial/ pp. 1-5.
Hollevoet et al., *A Power Optimized Display Memory Organization for Handheld User Terminals*, IEEE 2004, pp. 1-6.
Akeley et al., Real-Time Graphics Architecture, http://graphics.stanford.edu/courses/cs448a-01-fall, 2001, pp. 1-19.
Gatti et al., Lower Power Control Techniques for TFT LCD Displays, Oct. 8-11, 2002, Grenoble, France, pp. 218-224.
Choi et al., Low-Power Color TFT LCD Display for Hand-Held Embedded Systems, Aug. 12-14, 2002, Monterey, California, pp. 112-117.
Iyer et al., Energy-Adaptive Display System Designs for Future Mobile Environments, HP Laboratories Palto Alto, Apr. 23, 2003.
Shim et al., A Backlight Power Management Framework for Battery-Operated Multimedia Systems, Submitted to IEEE Design and Test of Computers, Special Issue on Embedded Systems for Real-Time Multimedia, vol. 21, Issue 5, pp. 388-396, May-Jun. 2004.
Shim, Low-Power LCD Display Systems, Jun. 2005.
Carts-Powell, Cholesteric LCDs Show Images After Power is Turned Off; OptoIQ, Sep. 1, 1998.
Zhong et al., Energy Efficiency of Handheld Computer Interfaces Limits, Characterization and Practice, Date, 2005.
Patel et al., Frame Buffer Energy Optimization by Pixel Prediction, Proceedings of the 2005 International Conference on Computer Design, Jun. 2005.
Smalley, ATI's Radeon X800 Series Can Do Transparency AA Too, Sep. 29, 2005.

(56) References Cited

OTHER PUBLICATIONS

Esselbach, Adaptive Anti-Aliasing on ATI Radeon X800 Boards Investigated, Oct. 17, 2005.
Digital Visual Interface DVI, Revision 1.0, Digital Display Working Group, Apr. 2, 1999, pp. 1-76.
Ma, OLED Solution for Mobile Phone Subdisplay, Apr. 2003.
Office Action mailed Dec. 20, 2013 in U.S. Appl. No. 13/435,733.
Office Action mailed Dec. 3, 2013 in U.S. Appl. No. 12/588,461.
Office Action mailed Nov. 8, 2013 in U.S. Appl. No. 12/923,518.
Office Action mailed Jul. 18, 2014 in U.S. Appl. No. 12/923,518.
Office Action mailed Jul. 22, 2014 in U.S. Appl. No. 12/588,461.
English Translation of Japanese Official Action mailed Apr. 7, 2014 in Japanese Application No. 2010-213508.
U.S. Office Action issued in U.S. Appl. No. 13/435,733 dated Jun. 17, 2014.
Japanese Office Action issued in Japanese Patent Application No. 2010-213509 dated Jun. 23, 2014 (w/translation)-7 pp.
Chinese First Office Action dated Jul. 31, 2014 in CN 201010294382.5 and English translation, 54 pages.
Chinese First Office Action dated Jun. 11, 2014 in CN 201010294392.9 and English translation, 17 pages.

METHODS OF AND APPARATUS FOR CONTROLLING THE READING OF ARRAYS OF DATA FROM MEMORY

This application is a continuation-in-part (CIP) application of commonly-assigned U.S. Ser. No. 12/588,459, filed on Oct. 15, 2009, and claims priority to UK Patent Application No. 0916924.4, filed on Sep. 25, 2009, and UK Patent Application No. 1014602.5, filed on Sep. 2, 2010, the disclosures of each of which are incorporated herein by reference.

The technology described in this application relates to graphics processing systems and in particular to frame buffer generation and similar operations in graphics processing systems.

As is known in the art, the output of a graphics processing system to be displayed is usually written to a so-called "frame buffer" in memory when it is ready for display. The frame buffer is then read by a display controller and output to the display (which may, e.g., be a screen or a printer) for display.

The writing of the graphics data to the frame buffer consumes a relatively significant amount of power and memory bandwidth, particularly where, as is typically the case, the frame buffer resides in memory that is external to the graphics processor. For example, a new frame may need to be written to the frame buffer at rates of 30 frames per second or higher, and each frame can require a significant amount of data, particularly for higher resolution displays and high definition (HD) graphics.

The technology described in this application also relates to the reading of arrays of data from memory for processing. One example of this is the operation of display controllers when processing images from a frame buffer for display.

As is known in the art, in many electronic devices and systems, arrays of data, such as images, will need to be processed. For example, an image that is to be displayed to a user will usually be processed by a so-called "display controller" of a display device for display.

Typically, the display controller will read the output image to be displayed from a so-called "frame buffer" in memory which stores the image as a data array and provide the image data appropriately to the display. In the case of a graphics processing system, for example, the output image of the graphics processing system will be stored in the frame buffer in memory when it is ready for display and the display controller will then read the frame buffer and provide it to the display (which may, e.g., be a screen or printer) for display.

As is known in the art, the frame buffer itself is usually stored in so-called "main" memory of the system in question, and that is therefore external to the display device and to the display controller. The reading of data from the frame buffer for display can therefore consume a relatively significant amount of power and memory bandwidth. For example, a new image frame may need to be read and displayed from the frame buffer at rates of 30 frames per second or higher, and each frame can require a significant amount of data, particularly for higher resolution displays and high definition (HD) graphics.

Other arrangements in which data arrays may need to be read from memory for processing include, for example, the situation where a CPU may need to read in an image generated by a graphics processor to modify it, and where a graphics processor may need to read in an externally generated texture that it is then to use in its graphics processing. These arrangements can also consume relatively significant memory bandwidth and power when reading the stored data array for processing.

It is known therefore to be desirable to try to reduce the power consumption of frame buffer operations and various techniques have been proposed to try to achieve this.

These techniques include providing an on-chip (as opposed to external) frame buffer, frame buffer caching (buffering), frame buffer compression and dynamic colour depth control. However, each of these techniques has its own drawbacks and disadvantages.

For example, using an on-chip frame buffer, particularly for higher resolution displays, may require a large amount of on-chip resources. Frame buffer caching or buffering may not be practicable as frame generation is typically asynchronous to frame buffer display. Frame buffer compression can help, but the necessary logic is relatively complex, and the frame buffer format is altered. Lossy frame buffer compression will reduce image quality. Dynamic colour depth control is similarly a lossy scheme and therefore reduces image quality.

The Applicants believe therefore that there remains scope for improvements to frame buffer generation and similar operations in graphics processing systems.

The Applicants also believe therefore that there remains scope for improvements to data array, such as frame buffer, reading operations.

According to a first aspect of the technology described in this application, there is provided a method of operating a graphics processing system in which data generated by the graphics processing system is used to form an output array of data in an output buffer, the method comprising:

the graphics processing system storing the output array of data in the output buffer by writing blocks of data representing particular regions of the output array of data to the output buffer; and the graphics processing system, when a block of data is to be written to the output buffer, comparing that block of data to at least one block of data already stored in the output buffer, and determining whether or not to write the block of data to the output buffer on the basis of the comparison.

According to a second aspect of the technology described in this application, there is provided a graphics processing system, comprising:

a graphics processor comprising means for generating data to form an output array of data to be provided by the graphics processor;

means for storing data generated by the graphics processor as an array of data in an output buffer by writing blocks of data representing particular regions of the array of data to the output buffer; and wherein:

the graphics processing system further comprises:

means for comparing a block of data that is ready to be written to the output buffer to at least one block of data already stored in the output buffer and for determining whether or not to write the block of data to the output buffer on the basis of that comparison.

According to a third aspect of the technology described in this application, there is provided a graphics processor comprising:

means for writing a block of data generated by the graphics processor and representing a particular region of an output array of data to be provided by the graphics processor to an output buffer; and means for comparing a block of data that is ready to be written to the output buffer to at least one block of data already stored in the output buffer and for determining whether or not to write the block of data to the output buffer on the basis of that comparison.

These aspects of the technology described in this application relate to and are implemented in a graphics processing system in which an output array of data (which could be, e.g., and in one preferred embodiment is, a frame to be displayed) is stored in an output buffer (which could, e.g., be, and in one preferred embodiment is, the frame buffer) by writing blocks of data (which could, e.g., be, and in one preferred embodiment are, rendered tiles generated by the graphics processor) that represent particular regions of the output array of data to the output buffer.

In essence therefore, these aspects of the technology described in this application relate to and are intended to be implemented in graphic processing systems in which the overall, "final" output of the graphics processing system is stored in memory on a block-by-block basis, rather than directly as a single, overall, output "frame".

This will be the case, for example, and as will be appreciated by those skilled in the art, in a tile-based graphics processing system, in which case each block of data that is considered and compared in the manner of the technology described in this application may (and in one preferred embodiment does) correspond to a "tile" that the rendering process of the graphics processor produces (although as will be discussed further below, this is not essential).

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (sub-regions) are each rendered separately (typically one after another). The rendered tiles (sub-regions) are then recombined to provide the complete output array (frame) (render target), e.g. for display.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.)

In these aspects of the technology described in this application, rather than each output data block (e.g. rendered tile) simply being written out to the frame buffer once it is ready, the output data block is instead first compared to a data block or blocks (e.g. tile or tiles) (to at least one data block) that is already stored in the output (e.g. frame) buffer, and it is then determined whether to write the (new) data block to the output buffer (or not) on the basis of that comparison.

As will be discussed further below, the Applicants have found and recognised that this process can be used to reduce significantly the number of data blocks (e.g. rendered tiles) that will be written to the output (e.g. frame) buffer in use, thereby significantly reducing the number of output (e.g. frame) buffer transactions and hence the power and memory bandwidth consumption related to output (e.g. frame) buffer operation.

For example, if it is found that a newly generated data block is the same as a data block (e.g. rendered tile) that is already present in the output buffer, it can be (and preferably is) determined to be unnecessary to write the newly, generated data block to the output buffer, thereby eliminating the need for that output buffer "transaction".

Moreover, the Applicants have recognised that it may be a relatively common occurrence for a new data block (e.g. rendered tile) to be the same or similar to a data block (e.g. rendered tile) that is already in the output (e.g. frame) buffer, for example in regions of an image that do not change from frame to frame (such as the sky, the playfield when the camera position is static, much of the user interface for many applications, etc.). Thus, by facilitating the ability to identify such regions (e.g. tiles) and to then, if desired, avoid writing such regions (e.g. tiles) to the output (e.g. frame) buffer again, a significant saving in write traffic (write transactions) to the output (e.g. frame) buffer can be achieved.

For example, the Applicants have found that for some common games, up to 20% (or even more) of the rendered tiles in each frame may be unchanged. If 20% of the tiles in a frame are not rewritten to the frame buffer (by using the technology described in this application) then for HD 1080p graphics at 30 frames per second (fps) the estimated power and memory bandwidth savings may be about 30 mW and 50 MB/s. In cases where even more rendered tiles do not change from frame to frame, even greater power and bandwidth savings can be achieved. For example, if 90% of the rendered tiles are not rewritten (are unchanged) then the savings may be of the order of 135 mW and 220 MB/s.

Thus these aspects of the technology described in this application can be used to significantly reduce the power consumed and memory bandwidth used for frame and other output buffer operation, in effect by facilitating the identification and elimination of unnecessary output (e.g. frame) buffer transactions.

Furthermore, compared to the prior art schemes discussed above, these aspects of the technology described in this application require relatively little on-chip hardware, can be a lossless process, and doesn't change the frame buffer format. They can also readily be used in conjunction with, and are complementary to, existing frame buffer power reduction schemes, thereby facilitating further power savings if desired.

The output array of data that the data generated by the graphics processing system is being used to form may be any suitable and desired such array of data, i.e. that a graphics processor may be used to generate. In one particularly preferred embodiment it comprises an output frame for display, but it may also or instead comprise other outputs of a graphics processor such as a graphics texture (where, e.g., the render "target" is a texture that the graphics processor is being used to generate (e.g. in "render to texture" operation) or other surface to which the output of the graphics processor system is to be written.

Similarly, the output buffer that the data is to be written to may comprise any suitable such buffer and may be configured in any suitable and desired manner in memory. For example, it may be an on-chip buffer or it may be an external buffer (and, indeed, may be more likely to be an external buffer (memory), as will be discussed below). Similarly, it may be dedicated memory for this purpose or it may be part of a memory that is used for other data as well. In one preferred embodiment the output buffer is a frame buffer for the graphics processing system and/or for the display that the graphics processing system's output is to be provided to.

The blocks of data that are considered and compared in the technology described in this application can each represent any suitable and desired region (area) of the overall output array of data that is to be stored in the output buffer. So long as the overall output array of data is divided or partitioned into a plurality of identifiable smaller regions each representing a part of the overall output array, and that can accordingly be represented as blocks of data that can be identified and compared in the manner of the technology described in this application, then the sub-division of the output array into blocks of data can be done as desired.

Each block of data preferably represents a different part (sub-region) of the overall output array (although the blocks could overlap if desired). Each block should represent an appropriate portion (area) of the output array, such as a plurality of data positions within the array. Suitable data block sizes would be, e.g., 8×8, 16×16 or 32×32 data positions in the output data array.

In one particularly preferred embodiment, the output array of data is divided into regularly sized and shaped regions (blocks of data), preferably in the form of squares or rectangles. However, this is not essential and other arrangements could be used if desired.

In one particularly preferred embodiment, each data block corresponds to a rendered tile that the graphics processor produces as its rendering output. This is a particularly straightforward way of implementing the technology described in this application, as the graphics processor will generate the rendering tiles directly, and so there will be no need for any further processing to "produce" the data blocks that will be considered and compared in the manner of the technology described in this application. In this case therefore, as each rendered tile generated by the graphics processor is to be written to the output (e.g. frame) buffer, it will be compared with a rendered tile or tiles already stored in the output buffer and the newly rendered tile then written or not to the output buffer on the basis of that comparison.

Thus, according to a fourth aspect of the technology described in this application, there is provided a method of operating a tile-based graphics processing system in which rendered tiles generated by the graphics processing system are to be written to an output buffer once they are generated, the method comprising:

the graphics processing system, when a tile for output to the output buffer has been completed, comparing that tile to at least one tile already stored in the output buffer, and determining whether or not to write the completed tile to the output buffer on the basis of the comparison.

According to a fifth aspect of the technology described in this application, there is provided a graphics processing system, comprising:

a tile-based graphics processor comprising means for generating output tiles of an output to be provided by the graphics processor;

means for writing an output tile generated by the graphics processor to an output buffer once the output tile has been completed; and wherein:

the graphics processing system further comprises:

means for comparing an output tile that has been completed to at least one tile already stored in the output buffer and for determining whether or not to write the completed tile to the output buffer on the basis of that comparison.

According to a sixth aspect of the technology described in this application, there is provided a tile-based graphics processor comprising:

means for generating output tiles of an output to be provided by the graphics processor;

means for writing an output tile generated by the graphics processor to an output buffer once the output tile has been completed; and means for comparing an output tile the graphics processor has completed to at least one tile already stored in the output buffer and for determining whether or not to write the completed tile to the output buffer on the basis of that comparison.

As will be appreciated by those skilled in the art, these aspects and embodiments of the technology described in this application can and preferably do include any one or more or all of the preferred and optional features of the technology described herein, as appropriate. Thus, for example, output buffer in one preferred embodiment is the frame buffer.

In these aspects and arrangements of the technology described in this application, the (rendering) tiles that the render target (the output data array) is divided into for rendering purposes can be any desired and suitable size or shape. The rendered tiles are preferably all the same size and shape, as is known in the art, although this is not essential. In a preferred embodiment, each rendered tile is rectangular, and preferably 16×16, 32×32 or 8×8 sampling positions in size.

In a particularly preferred embodiment, the technology described in this application may be, and preferably is, also or instead performed using data blocks of a different size and/or shape to the tiles that the rendering process operates on (produces).

For example, in a preferred embodiment, a or each data block that is considered and compared in the technology described in this application may be made up of a set of plural "rendered" tiles, and/or may comprise only a sub-portion of a rendered tile. In these cases there may be an intermediate stage that, in effect, "generates" the desired data block from the rendered tile or tiles that the graphics processor generates.

In one preferred embodiment, the same block (region) configuration (size and shape) is used across the entire output array of data. However, in another preferred embodiment, different block configurations (e.g. in terms of their size and/or shape) are used for different regions of a given output data array. Thus, in one preferred embodiment, different data block sizes may be used for different regions of the same output data array.

In a particularly preferred embodiment, the block configuration (e.g. in terms of the size and/or shape of the blocks being considered) can be varied in use, e.g. on an output data array (e.g. output frame) by output data array basis. Most preferably the block configuration can be adaptively changed in use, for example, and preferably, depending upon the number or rate of output buffer transactions that are being eliminated (avoided). For example, and preferably, if it is found that using a particular block size only results in a low probability of a block not needing to be written to the output buffer, the block size being considered could be changed for subsequent output arrays of data (e.g., and preferably, made smaller) to try to increase the probability of avoiding the need to write blocks of data to the output buffer.

Where the data block size is varied in use, then that may be done, for example, over the entire output data array, or over only particular portions of the output data array, as desired.

The comparison of the newly generated output data block (e.g. rendered tile) with a data block already stored in the output (e.g. frame) buffer can be carried out as desired and in any suitable manner. The comparison is preferably so as to determine whether the new data block is the same as (or at least sufficiently similar to) the already stored data block or not. Thus, for example, some or all of the content of the new data block may be compared with some or all of the content of the already stored data block.

In a particularly preferred embodiment, the comparison is performed by comparing information representative of and/or derived from the content of the new output data block with information representative of and/or derived from the content of the stored data block, e.g., and preferably, to assess the similarity or otherwise of the data blocks.

The information representative of the content of each data block (e.g. rendered tile) may take any suitable form, but is preferably based on or derived from the content on the data block. Most preferably it is in the form of a "signature" for the data block which is generated from or based on the content of the data block. Such a data block content "signature" may comprise, e.g., and preferably, any suitable set of derived information that can be considered to be representative of the content of the data block, such as a checksum, a CRC, or a hash value, etc., derived from (generated for) the data block. Suitable signatures would include standard CRCs, such as CRC32, or other forms of signature such as MD5, SHA-1, etc.

Thus, in a particularly preferred embodiment, a signature indicative or representative of, and/or that is derived from, the content of the data block is generated for each data block that is to be compared, and the comparison process comprises comparing the signatures of the respective data blocks.

Thus, in a particularly preferred embodiment, when the system is operating in the manner of the technology described in this application, a signature, such as a CRC value, is generated for each data block that is to be written to the output buffer (e.g. and preferably, for each output rendered tile that is generated). Any suitable "signature" generation process, such as a CRC function or a hash function, can be used to generate the signature for a data block. Preferably the data block (e.g. tile) data is processed in a selected, preferably particular or predetermined, order when generating the data block's signature. This may further help to reduce power consumption. In one preferred embodiment, the data is processed using Hilbert order (the Hilbert curve).

The signatures for the data blocks (e.g. rendered tiles) that are stored in the output (e.g. frame) buffer should be stored appropriately. Preferably they are stored with the output (e.g. frame) buffer. Then, when the signatures need to be compared, the stored signature for a data block can be retrieved appropriately. Preferably the signatures for one or more data blocks, and preferably for a plurality of data blocks, can be and are cached locally to the comparison stage or means, e.g. on the graphics processor itself, for example in an on-chip signature (e.g., CRC) buffer. This may avoid the need to fetch a data block's signature from an external buffer every time a comparison is to be made, and so help to reduce the memory bandwidth used for reading the signatures of data blocks.

Where representations of data block content, such as data block signatures, are cached locally, e.g., stored in an on-chip buffer, then the data blocks are preferably processed in a suitable order, such as a Hilbert order, so as to increase the likelihood of matches with the data block(s) whose signatures, etc., are cached locally (stored in the on-chip buffer).

Although, as will be appreciated by those skilled in the art, the generation and storage of a signature for data blocks (e.g. rendered tiles) will require some processing and memory resource, the Applicants believe that this will be outweighed by the potential savings in terms of power consumption and memory bandwidth that can be provided by the technology described in this application.

It would, e.g., be possible to generate a single signature for an, e.g., RGBA, data block (e.g. rendered tile), or a separate signature (e.g. CRC) could be generated for each colour plane. Similarly, colour conversion could be performed and a separate signature generated for the Y, U, V planes if desired.

As will be appreciated by those skilled in the art, the longer the signature that is generated for a data block is (the more accurately the signature represents the data block), the less likely there will be a false "match" between signatures (and thus, e.g., the erroneous non-writing of a new data block to the output buffer). Thus, in general, a longer or shorter signature (e.g. CRC) could be used, depending on the accuracy desired (and as a trade-off relative to the memory and processing resources required for the signature generation and processing, for example).

In a particularly preferred embodiment, the signature is weighted towards a particular aspect of the data block's content as compared to other aspects of the data block's content (e.g., and preferably, to a particular aspect or part of the data for the data block (the data representing the data block's content)). This may allow, e.g., a given overall length of signature to provide better overall results by weighting the signature to those parts of the data block content (data) that will have more effect on the overall output (e.g. as perceived by a viewer of the image).

In a preferred such embodiment, a longer (more accurate) signature is generated for the MSB bits of a colour as compared to the LSB bits of the colour. (In general, the LSB bits of a colour are less important than the MSB bits, and so the Applicants have recognised that it may be acceptable to use a relatively inaccurate signature for the LSB bits, as errors in comparing the LSB bits for different output data blocks (e.g. rendered tiles) will, the Applicants believe, have a less detrimental effect on the overall output.)

It would also be possible to use different length signatures for different applications, etc., depending upon the, e.g., application's, e.g., display, requirements. This may further help to reduce power consumption. Thus, in a preferred embodiment, the length of the signature that is used can be varied in use. Preferably the length of the signature can be changed depending upon the application in use (can be tuned adaptively depending upon the application that is in use).

In a particularly preferred embodiment, the completed data block (e.g. rendered tile) is not written to the output buffer if it is determined as a result of the comparison that the data block should be considered to be the same as a data block that is already stored in the output buffer. This thereby avoids writing to the output buffer a data block that is determined to be the same as a data block that is already stored in the output buffer.

Thus, in a particularly preferred embodiment, the technology described in this application comprises comparing a signature representative of the content of a data block (e.g. a rendered tile) with the signature of a data block (e.g. tile) stored in the output (e.g. frame) buffer, and if the signatures are the same, not writing the (new) data block (e.g. tile) to the output buffer (but if the signatures differ, writing the (new) data block (e.g. tile) to the output buffer).

Where the comparison process requires an exact match between data blocks being compared (e.g. between their signatures) for the block to be considered to match such the new block is not written to the output buffer, then, if one ignores any effects due erroneously matching blocks, the technology described in this application should provide an, in effect, lossless process. If the comparison process only requires a sufficiently similar (but not exact) match, then the process will be "lossy", in that a data block may be substituted by a data block that is not an exact match for it.

The current, completed data block (e.g. rendered tile) (e.g., and preferably, its signature) can be compared with one, or with more than one, data block that is already stored in the output buffer.

Preferably at least one of the stored data blocks (e.g. tiles) the (new) data block is compared with (or the only stored data block that the (new) data block is compared with) comprises the data block in the output buffer occupying the same position (the same data block (e.g. tile) position) as the completed, new data block is to be written to. Thus, in a preferred embodiment, the newly generated data block is compared with the equivalent data block (or blocks, if appropriate) already stored in the output buffer.

In one preferred embodiment, the current (new) data block is compared with a single stored data block only.

In another preferred embodiment, the current, completed data block (e.g. its signature) is compared to (to the signatures of) plural data blocks that are already stored in the output buffer. This may help to further reduce the number of data blocks that need to be written to the output buffer, as it will allow the writing of data blocks that are the same as data blocks in other positions in the output buffer to be eliminated.

In this case, where a data block matches to a data block in a different position in the output buffer, the system preferably outputs and stores an indication of which already stored data block is to be used for the data block position in question. For example a list that indicates whether the data block is the same as another data block stored in the output buffer having a different data block position (coordinate) may be maintained. Then, when reading the data block for, e.g., display purposes, the corresponding list entry may be read, and if it is, e.g., "null", the "normal" data block is read, but if it contains the address of a different data block, that different data block is read.

Where a data block is compared to plural data blocks that are already stored in the output buffer, then while each data block could be compared to all the data blocks in the output buffer, preferably each data block is only compared to some, but not all, of the data blocks in the output buffer, such as, and preferably, to those data blocks in the same area of the output data array as the new data block (e.g. those data blocks covering and surrounding the intended position of the new data block). This will provide an increased likelihood of detecting data block matches, without the need to check all the data blocks in the output buffer.

In one preferred embodiment, each and every data block that is generated for an output data array is compared with a stored data block or blocks. However, this is not essential, and so in another preferred embodiment, the comparison is carried out in respect of some but not all of the data blocks of a given output data array (e.g. output frame).

In a particularly preferred embodiment, the number of data blocks that are compared with a stored data block or blocks for respective output data arrays is varied, e.g., and preferably, on an output array by output array (e.g. frame-by-frame), or over sequences of output arrays (e.g. frames), basis. This is preferably based on the expected correlation (or not) between successive output data arrays (e.g. frames).

Thus the technology described in this application preferably comprises means for or a step of selecting the number of the data blocks that are to be written to the output buffer that are to be compared with a stored data block or blocks for a given output data array.

Preferably, fewer data blocks are subjected to a comparison when there is (expected to be) little correlation between different output data arrays (such that, e.g., signatures are generated on fewer data blocks in that case), whereas more (and preferably all) of the data blocks in an output data array are subjected to the comparison stage (and have signatures generated for them) when there is (expected to be) a lot of correlation between different output data arrays (such that it should be expected that a lot of newly generated data blocks will be duplicated in the output buffer). This helps to reduce the amount of comparisons and signature generation, etc., that will be performed (which will consume power and resources) where it might be expected that fewer data blocks write transactions will be eliminated (where there is little correlation between output data arrays), whilst still facilitating the use of the comparison process of the technology described in this application where that might be expected to be particularly beneficial (i.e. where there is a lot of correlation between output data arrays).

In these arrangements, the amount of (expected) correlation between different (e.g. successive) output data arrays is preferably estimated for this purpose. This can be done as desired, but is preferably based on the correlation between earlier output data arrays. Most preferably the number of matching data blocks in previous pairs or sequences of output data arrays (as determined, e.g., and preferably, by comparing the data blocks in the manner of the technology described in this application), and most preferably in the immediately preceding pair of output data arrays (e.g. output frames), is used as a measure of the expected correlation for the current output data array. Thus, in a particularly preferred embodiment, the number of data blocks found to match in the previous output data array is used to select how many data blocks in the current output data array should be compared in the manner of the technology described in this application.

In a particularly preferred embodiment, the number of data blocks that are compared in the manner of the technology described in this application can be, and preferably is, varied as between different regions of the output data array. In one such arrangement, this is based on the location of previous data block matches within an output array, i.e. such that an estimate of those regions of an output array that are expected to have a high correlation (and vice-versa) is determined and then the number of data blocks in different regions of the output array to be processed in the manner of the technology described in this application controlled and selected accordingly. For example, and preferably, the location of previous data block matches may be used to determine whether and which regions of the output array are likely to remain the same and the number of data blocks processed in the manner of the technology described in this application then increased in those regions.

In a preferred embodiment, it is possible for the software application (e.g. that is to use and/or receive the output array generated by the graphics processing system) to indicate and control which regions of the output data array are processed in the manner of the technology described in this application, and in particular, and preferably, to indicate which regions of the output array the data block signature calculation process should be performed for. This would then allow the signature calculation to be "turned off" by the application for regions of the output array the application "knows" will be always updated.

This may be achieved as desired. In a preferred embodiment registers are provided that enable/disable data block (e.g. rendered tile) signature calculations for output array regions, and the software application then sets the registers accordingly (e.g. via the graphics processor driver). The number of such registers may be chosen, e.g., as a trade-off between the extra logic required for the registers, the desired granularity of control, and the potential savings from being able to disable the signature calculations.

In a particularly preferred embodiment, the system is configured to always write a newly generated data block to the output buffer periodically, e.g., once a second, in respect of each given data block (data block position). This will then ensure that a new data block is written into the output buffer at least periodically for every data block position, and thereby avoid, e.g., erroneously matched data blocks (e.g. because the data block signatures happen to match even though the data blocks' content actually varies) being retained in the output buffer for more than a given, e.g. desired or selected, period of time.

This may be done, e.g., by simply writing out an entire new output data array periodically (e.g. once a second). However, in a particularly preferred embodiment, new data blocks are written out to the output buffer individually on a rolling basis, so that rather than writing out a complete new output array in one go, a selected portion of the data blocks in the output array are written out to the output buffer each time a new output array is being generated, in a cyclic pattern so that over time all the data blocks are eventually written out as new. In one preferred such arrangement, the system is configured such that a (different) selected 1/nth portion (e.g. twenty-fifth) of the data blocks are written out completely each output array (e.g. frame), so that by the end of a sequence of n (e.g. 25) output arrays (e.g. frames), all the data blocks will have been written to the output buffer completely at least once.

This operation is preferably achieved by disabling the data block comparisons for the relevant data blocks (i.e. for those data blocks that are to be written to the output buffer in full). (Data block signatures are preferably still generated for the data blocks that are written to the output buffer in full, as that will then allow those blocks to be compared with future data blocks.)

Where the technology described in this application is to be used with a double-buffered output (e.g. frame) buffer, i.e. an output buffer which stores two output arrays (e.g. frames) concurrently, e.g. one being displayed and one that has been displayed and is therefore being written to as the next output array (e.g. frame) to display, then the comparison process of the technology described in this application preferably compares the newly generated data block with the oldest output array in the output buffer (i.e. will compare the newly generated data block with the output array that is not currently being displayed, but that is being written to as the next output array to be displayed).

In a particularly preferred embodiment, the technology described in this application is used in conjunction with another frame (or other output) buffer power and bandwidth reduction scheme or schemes, such as, and preferably, output (e.g. frame) buffer compression (which may be lossy or lossless, as desired).

In a preferred arrangement of the latter case, if after the comparison process the newly generated data block is to be written to the output (e.g. frame) buffer, the data block would then be accordingly compressed before it is written to the output (e.g. frame) buffer.

Where a data block is to undergo some further processing, such as compression, before it is written to the output buffer, then it would be possible, e.g., to perform the additional processing, such as compression, on the data block anyway, and then to write the so-processed data block to the output buffer or not on the basis of the comparison. However, in a particularly preferred embodiment, the comparison process of the technology described in this application is performed first, and the further processing, such as compression, of the data block only performed if it is determined that the data block is to be written to the output buffer. This will then allow the further processing of the data block to be avoided if it is determined that the block does not need to be written to the output buffer.

The tile comparison process (and signature generation, where used) may be implemented in an integral part of the graphics processor, or there may, e.g., be a separate "hardware element" that is intermediate the graphics processor and the output (e.g. frame) buffer.

In a particularly preferred embodiment, there is a "transaction elimination" hardware element that carries out the comparison process and controls the writing (or not) of the data blocks to the output buffer. This hardware element preferably also does the signature generation (and caches signatures of stored data blocks) where that is done. Similarly, where the data blocks that the technology described in this application operates on are not the same as the, e.g., rendered tiles that the rendering process produces, this hardware element preferably generates or assembles the data blocks from the rendered tiles that the rendering process generates.

In one preferred embodiment, this hardware element is separate to the graphics processor, and in another preferred embodiment is integrated in (part of) the graphics processor. Thus, in one preferred embodiment, the comparison means, etc., is part of the graphics processor itself, but in another preferred embodiment, the graphics processing system comprises a graphics processor, and a separate "transaction elimination" unit or element that comprises the comparison means, etc.

These aspects of the technology described in this application can be used irrespective of the form of output that the graphics processor may be providing to the output buffer. Thus, for example, it may be used where the data blocks and the output data array are intended to form an image for display (e.g. on a screen or printer) (and in one preferred embodiment this is the case). However, the technology described in this application may also be used where the output is not intended for display, for example where the output data array (render target) is a texture that the graphics processor is being used to generate (e.g. in "render to texture" operation), or, indeed, where the output the graphics processor is being used to generate is any other form of data array.

Similarly, although the technology described in this application has been described above with particular reference to graphics processor operation, the Applicants have recognised that the principles of the technology described in this application can equally be applied to other systems that process data in the form of blocks in a similar manner to, e.g., tile-based graphics processing systems. Thus the technology described in this application may equally be used, for example, for video processing (as video processing operates on blocks of data analogous to tiles in graphics processing), and for composite image processing (as again the composition frame buffer will be processed as distinct blocks of data).

Thus, according to a seventh aspect of the technology described in this application, there is provided a method of operating a data processing system in which data generated by the data processing system is used to form an output array of data in an output buffer, the method comprising:

the data processing system storing the output array of data in the output buffer by writing blocks of data representing particular regions of the output array of data to the output buffer; and the data processing system, when a block of data is to be written to the output buffer, comparing that block of data to at least one block of data already stored in the output buffer, and determining whether or not to write the block of data to the output buffer on the basis of the comparison.

According to an eighth aspect of the technology described in this application, there is provided a data processing system, comprising:

a data processor comprising means for generating data to form an output array of data to be provided by the data processor;

means for storing data generated by the data processor as an array of data in an output buffer by writing blocks of data representing particular regions of the array of data to the output buffer; and wherein:

the data processing system further comprises:

means for comparing a block of data that is ready to be written to the output buffer to at least one block of data already stored in the output buffer and for determining whether or not to write the block of data to the output buffer on the basis of that comparison.

According to a ninth aspect of the technology described in this application, there is provided a data processor comprising:

means for writing a block of data generated by the data processor and representing a particular region of an output array of data to be provided by the data processor to an output buffer; and means for comparing a block of data that is ready to be written to the output buffer to at least one block of data already stored in the output buffer and for determining whether or not to write the block of data to the output buffer on the basis of that comparison.

The technology described in this application also extends to the provision of a particular hardware element for performing the comparison and consequent determination of the technology described in this application. As discussed above, this hardware element (logic) may, for example, be provided as an integral part of a, e.g., graphics processor, or may be a standalone element that can, e.g., interface between a graphics processor, for example, and an external memory controller. It may be a programmable or dedicated hardware element.

Thus, according to a tenth aspect of the technology described in this application, there is provided a write transaction elimination apparatus for use in a data processing system in which an output array of data generated by the data processing system is stored in an output buffer by writing blocks of data representing particular regions of the output array of data to the output buffer, the apparatus comprising:

means for comparing a block of data that is ready to be written to the output buffer with at least one block of data already stored in the output buffer, and for determining whether or not to write the block of data to the output buffer on the basis of the comparison.

As will be appreciated by those skilled in the art, all these aspects and embodiments of the technology described in this application can and preferably do include any one or more or all of the preferred and optional features of the technology described herein. Thus, for example, the comparison preferably comprises comparing signatures representative of the contents of the respective data blocks.

In these arrangements, the data blocks may, e.g., be, and preferably are, rendered tiles produced by a tile-based graphics processing system (a graphics processor), video data blocks produced by a video processing system (a video processor), and/or composite frame tiles produced by a composition processing system, etc.

It would also be possible to use the technology described in this application where there are, for example, plural masters all writing data blocks to the output buffer. This may be the case, for example, when a host processor generates an "overlay" to be displayed on an image that is being generated by a graphics processor.

In such a case, all of the different master devices may, for example, have their outputs subjected to the data block comparison process. Alternatively, the data block comparison process may be disabled when there are two or more master devices generating data blocks for the output data array. In this case, the comparison process may, e.g., be disabled for the entire output data array, or only for those portions of the output data array for which it is possible that two master devices may be generating output data blocks (e.g., only for the region of the output data array where the host processor's "overlay" is to appear).

In a particularly preferred embodiment, the data block signatures that are generated for use in the technology described in this application are "salted" (i.e. have another number (a salt value) added to the generated signature value) when they are created. The salt value may conveniently be, e.g., the data output array (e.g. frame) number since boot, or a random value. This will, as is known in the art, help to make any error caused by any inaccuracies in the comparison process of the technology described in this application non-deterministic (i.e. avoid, for example, the error always occurring at the same point for repeated viewings of a given sequence of images such as, for example, where the process is being used to display a film or television programme).

Typically the same salt value will be used for a frame. The salt value may be updated for each frame or periodically. For periodic salting it is beneficial to change the salt value at the same time as the signature comparison is invalidated (where that is done), to minimise bandwidth to write the signatures.

The Applicants have further recognised that the techniques of the technology described in this application can be used to assess or estimate the correlation between successive, and/or sequences of, output data arrays (e.g. frames) (i.e. the extent to which output data arrays (e.g. frames) are similar to each other) in, e.g., tile-based graphics processing systems, by, e.g., counting the number of data block (e.g. tile) "matches" that the technology described in this application identifies. Moreover, the Applicants have recognised that this information would be useful, for example because if it indicates that successive frames are the same (the correlation is high) that would suggest, e.g., that the image is static for a period of time. If that is the case, then, e.g., it may be possible to reduce the frame rate.

Thus, according to a further aspect of the technology described in this application, there is provided a method of operating a data processing system in which an output array of data is generated by the data processing system writing blocks of data representing particular regions of the output array of data to an output buffer for storing the output array of data, the method comprising:

the data processing system, when a block of data is to be written to the output buffer, comparing that block of data to at least one block of data already stored in the output buffer, and using the results of the comparisons for plural blocks of data to estimate the correlation between different output arrays of the data processing system.

According to another aspect of the technology described in this application, there is provided a data processing system comprising:

means for generating data to form an output array of data to be provided by the data processing system;

means for storing data generated by the data processing system as an array of data in an output buffer by writing blocks of data representing particular regions of the array of data to the output buffer; and means for comparing a data block that is to be written to the output buffer to at least one data block already stored in the output buffer; and means for using the results of the comparisons for plural blocks of data to estimate the correlation between different output arrays of the data processing system.

As will be appreciated by those skilled in the art, all these aspects and embodiments of the technology described in this application can and preferably do include any one or more or all of the preferred and optional features of the technology described herein. Thus, for example, the comparison preferably comprises comparing signatures representative of the contents of the respective data blocks.

Similarly, the data blocks may, e.g., be, and preferably are, rendered tiles produced by a tile-based graphics processing system, video data blocks produced by a video processing system, and/or composite frame tiles produced by a composition processing system, etc.

In these arrangements, the estimated correlation between the different output arrays (e.g. frames) is preferably used to control a further process of the system in relation to the output arrays or frames, such as their frequency of generation and/or format, etc. Thus, in a particularly preferred embodiment, the output array (frame) generation rate and/or display fresh rate, and/or the form of anti-aliasing used for an output array (frame), is controlled or selected on the basis of the estimated correlation between different output arrays (frames).

As discussed above, the Applicants also believe therefore that there remains scope for improvements to data array, such as frame buffer, reading operations.

Thus, according to a further aspect of the technology described in this application, there is provided a method of processing an array of data in which a processing device processes the array of data by processing successive blocks of data each representing particular regions of the array of data and blocks of data representing particular regions of the array of data are read from a first memory in which the array of data is stored and stored in a memory of the processing device prior to the blocks of data being processed by the processing device; the method comprising:

determining whether a block of data to be processed for the data array is similar to a block of data that is already stored in the memory of the processing device, and either processing for the block of data to be processed a block of data that is already stored in the memory of the processing device, or a new block of data from the array of data stored in the first memory, on the basis of the similarity determination.

According to a further aspect of the technology described in this application, there is provided a system comprising:

a first memory for storing an array of data to be processed;

a processing device for processing an array of data stored in the first memory, by processing successive blocks of data, each representing particular regions of the array of data, and the processing device having a local memory;

a read controller configured to read blocks of data representing particular regions of an array of data that is stored in the first memory and to store the blocks of data in the local memory of the processing device prior to the blocks of data being processed by the processing device; and a controller configured to determine whether a block of data to be processed for the data array is similar to a block of data that is already stored in the memory of the processing device, and to cause the processing device to process for the block of data to be processed either a block of data that is already stored in the memory of the processing device, or a new block of data from the array of data stored in the first memory, on the basis of the similarity determination.

According to a further aspect of the technology described in this application, there is provided a processing device for processing an array of data stored in a first memory, the processing device being configured to process the array of data by processing successive blocks of data, each representing particular regions of the array of data; and comprising:

a local memory;

a read controller configured to read blocks of data representing particular regions of an array of data that is stored in the first memory and to store the blocks of data in the local memory of the processing device prior to the blocks of data being processed by the processing device; and a controller configured to determine whether a block of data to be processed for the data array is similar to a block of data that is already stored in the memory of the processing device, and to cause the processing device to process for the block of data to be processed either a block of data that is already stored in the memory of the processing device, or a new block of data from the array of data stored in the first memory, on the basis of the similarity determination.

These aspects of the technology described in this application relate to and are implemented in systems in which an array of data to be processed (which could be, e.g., and in one preferred embodiment is, a frame to be displayed) is read from memory for processing by a processing device (which could, e.g., and in one preferred embodiment is, a display controller)) in the form of blocks of data that represent particular regions of the array of data.

In essence therefore, these aspects of the technology described in this application relate to and are intended to be implemented in systems in which data arrays to be processed by the system are read from memory and processed on a block-by-block basis, rather than directly as a single, overall, output "array".

As discussed above, this may be the case, for example, for the display of images generated by a tile-based graphics processing system. In this case, the display controller may process each frame for display from the frame buffer on a tile-by-tile basis (although as will be discussed further below, this is not essential, and, indeed, may not always be preferred).

In these aspects of the technology described in this application, rather than each data block (e.g. rendered tile) simply being read out of the memory where the data array is stored and processed in turn, when a data block is to be processed (e.g. for display), it is first determined whether that block is similar to a data block (e.g. tile) that is already stored in a (local) memory of the processing device (e.g. display controller) that is to process the data array. It is then determined whether to process an existing data block in the local memory or a new data block from the stored data array in memory as the data block to be processed on the basis of the similarity determination.

As will be discussed further below, the Applicants have found and recognised that this process can be used to reduce significantly the number of data blocks (e.g. rendered tiles) that will be read from main memory (e.g. the frame buffer) for processing in use, thereby significantly reducing the number of main memory (e.g. frame buffer) read transactions and hence the power and memory bandwidth consumption related to main memory (e.g. frame buffer) read operations. It can also, accordingly, facilitate the use of lower performance, lower power memory systems, which may be particularly advantageous in the context of lower power, lower cost portable devices, for example.

For example, if it is found that a data block to be processed is the same as a data block (e.g. rendered tile) that is already present in the local memory of the processing device, it can be (and preferably is) determined to be unnecessary to read a data block from the stored data array to the processing device's local memory, thereby eliminating the need for that read "transaction". Thus, when the data block to be processed is determined to be similar to a data block already stored in the local memory of the processing device, preferably the (appropriate) existing block in the local memory of the processing device is processed by the processing device and vice-versa.

Moreover, the Applicants have recognised that, for example in the case of graphics processing, it may be a relatively common occurrence for a new data block (e.g. rendered tile) to be processed to be the same as or similar to a data block (e.g. rendered tile) that is already in the local memory of the, e.g. display controller. For example, in the case of graphics processing there will be regions of an image that will be similar to each other, such as the sky, sea, or other uniform background, etc., much of the user interface for many applications, etc. By facilitating the ability to identify such regions (e.g. tiles) and to then, if desired, avoid reading such regions (e.g. tiles) to the local memory of the display controller again, a significant saving in read traffic (read transactions) to the local memory of the, e.g. display controller, can be achieved.

Thus these aspects of the technology described in this application can be used to significantly reduce the power consumed and memory bandwidth used for frame buffer and memory read operations, in effect by facilitating the identification and elimination of unnecessary memory (e.g. frame buffer) read transactions.

Furthermore, compared to the prior art schemes discussed above, the technology described in this application requires relatively little on-chip hardware, can be a lossless process, and doesn't change the data array (e.g. frame buffer) format. It can also readily be used in conjunction with, and is complementary to, existing output (e.g. frame buffer) power reduction schemes, thereby facilitating further power savings if desired.

As will be discussed further below, these aspects of the technology described in this application can also be used to avoid the writing of data blocks to the initial data array in the first place. Such write transaction elimination can lead to further memory (e.g. frame buffer) transaction power and memory bandwidth savings. (As the data array is likely to be read more times than it is written to (updated), eliminating read transactions is particularly beneficial).

As discussed above, in a particularly preferred embodiment, the processing device determines whether to read a new data block from the data array in main memory into the local memory of the processing device or not on the basis of the similarity determination.

Thus, in a particularly preferred embodiment, if it is determined that a (e.g. the next) block of data to be processed is to be considered to be similar to a block of data already stored in the local memory of the processing device, a new block of data is not read from the data array in the main memory and stored in the local memory of the processing device, but instead the existing block of data in the local memory of the processing device is processed as the (e.g. next) block of data to be processed by the processing device.

On the other hand, if it is determined that a (e.g. the next) block of data to be processed is not to be considered to be similar to a block of data already stored in the local memory of the processing device, a new block of data is read from the data array in the main memory and stored in the local memory of the processing device, and then processed as the (e.g. next) block of data to be processed by the processing device.

As will be discussed further below, the similarity determination is preferably based on similarity information (metadata) that is associated with the data blocks in question. The generation of such similarity information is a further aspect of the technology described in this application. This is discussed in more detail below.

These aspects of the technology described in this application can be used in any system where data is stored as an array and read out to and processed by a processing device on a block-by-block basis. Thus it may be used, for example, in graphics processors, CPUs, video processors, composition engines, display controllers etc.

In general the technology described in this application is useful in eliminating read transactions (and write transactions) where nearby data blocks in a data array to be processed are likely to be similar or the same. Thus, the scheme can be used to eliminate read transactions (and write transactions) when, for example, image data is transferred between any two of: a graphics processor (GPU), a CPU, a video processor, a camera controller, and a display controller.

For example, as well as the operation of a display controller as discussed above, potentially and typically processing images to be displayed in the form of blocks of data represents the image, a video processor may generate an image that is to be transferred to a graphics processor for use as a texture, in which case the technique of the technology described in this application could be used to eliminate read transactions when the graphics processor reads in the image (texture) for use. Likewise, a frame generated by a graphics processor may be manipulated by a CPU, in which case the CPU may be operated in the manner of the technology described in this application to reduce the read transactions needed for the CPU to read the frame to manipulate it. This may also have the additional benefit that fewer cache lines can be used in the CPU.

Similarly a camera (video or still) may, e.g. process the image generated by its sensor on a block-by-block basis for storing in memory and subsequent provision to a data processing system, such as a computer, display, etc., that is to process the image.

The memory that the array of data is stored in may comprise any suitable such memory and may be configured in any suitable and desired manner. For example, it may be a memory that is on-chip with the processing device or it may be an external memory. In a preferred embodiment it is an external memory, such as a main memory of the system. It may be dedicated memory for this purpose or it may be part of a memory that is used for other data as well. In the case of a graphics processing system, in a preferred embodiment the memory that the data array is stored in is a frame buffer that the graphics processing system's output is to be provided to.

The array of data that is stored in the first (e.g. main) memory, and that is to be read out therefrom for processing can be any suitable and desired such array of data. It may, for example, comprise any suitable and desired array of data that a graphics processor may be used to generate. In a preferred embodiment it is data representing an image, e.g. that is to be displayed.

In one particularly preferred embodiment it comprises an output frame for display, but it may also or instead comprise other outputs of a graphics processor such as a graphics texture (where, e.g., the render "target" is a texture that the graphics processor is being used to generate (e.g. in "render to texture" operation) or other surface to which the output of the graphics processor system is to be written. It could also, e.g., comprise, as discussed above, an image generated by a video processor, or a CPU.

The processing device may be any device that is to read the data array (in a block-by-block fashion) and process it, e.g., for use or to alter its content. Thus it may, e.g., be, and in a preferred embodiment is, one of a display controller, a CPU, a video processor and a graphics processor.

The local memory of the processing device may similarly be any suitable such memory. It is preferably a buffer or cache memory of or associated with the processing device. The cache may be fully or set associative, for example.

As discussed above, in a particularly preferred embodiment, the technology described in this application is implemented in respect of a data array generated by a graphics processing system (a graphics processor), in which case the data array to be processed is preferably an output frame to be displayed, and the first, main memory in which the data array is stored is preferably a frame buffer of the graphics processing system. Similarly, the processing device that is to process the data array that the output frame is to be displayed on is preferably a display controller of or for a display device (e.g. screen or printer). It may also, e.g., be a CPU that is to manipulate a frame generated by the graphics processor, as discussed above.

The blocks of data that are processed (and compared) can each represent any suitable and desired region (area) of the overall array of data. So long as the overall array of data is divided or partitioned into a plurality of identifiable smaller regions each representing a part of the overall array, and that can accordingly be represented as blocks of data that can be identified and considered, then the sub-division of the array of data into blocks of data can be done as desired.

Each block of data preferably represents a different part (sub-region) of the overall data array (although the blocks could overlap if desired). Each block should represent an appropriate portion (area) of the data array, such as a plurality of data positions within the array. Suitable data block sizes would be, e.g., 8×8, 16×16 or 32×32 data positions in the data array.

In one particularly preferred embodiment, the array of data is divided into regularly sized and shaped regions (blocks of data), preferably in the form of squares or rectangles. However, this is not essential and other arrangements could be used if desired.

The similarity determination and consequent determination to process either a block of data that is already stored in the memory of the processing device or a new block of data from the array of data stored in the first memory may be performed in any desired and suitable manner and at any desired and suitable point and time as the data array is processed.

For example, the similarity determination and consequent data block selection may be (and in one preferred embodiment is) performed for each data block when it is the data block's turn to be processed. In this case, for example, it would be determined whether the next block of data to be processed after the current block of data that is being processed has been processed is similar to a block of data that is already stored in the memory of the processing device or not, and then a new or existing block of data processed for that next block of data accordingly.

However, in a particularly preferred embodiment, the similarity determination and consequent data block selection is performed in advance of the data blocks actually being processed. In this case, the similarity determination will be used to, for example, control the, in effect, "pre-fetching" of data blocks into the local memory of the processing device in advance of those data blocks then being taken from the local memory of the processing device and processed. This arrangement would be suitable where, for example, the processing device (e.g. display controller) operates by queuing data blocks to be processed in its local memory and then processes those blocks for display one-by-one from the queue. In such an arrangement, the similarity determination could be used to control the fetching of data blocks into the queue in the local memory (i.e. whether to, in effect, repeat a data block that is already in the queue or to fetch a new data block to the queue from the stored data array).

The determination of whether a new data block to be processed is similar to a block that is already stored in the local memory of the processing device (e.g. display controller) can be done in any suitable and desired manner. For example, a new data block to be read from the stored data array could be compared with a block or blocks that are already stored in the local memory to determine if the blocks are similar or not. Thus, for example, some of the content of the new data block could be compared with some or all of the content of a or the data block or blocks already stored in the local memory.

In a particularly preferred embodiment, information that is associated with the data array is used to determine whether any given blocks should be considered to be similar to each other or not. Thus, in a particularly preferred embodiment, rather than comparing the content of the data blocks themselves, the similarity determination process determines whether a data block to be processed is similar to a block that is already stored in the local memory using information that is associated with the array of data.

In other words, the similarity determination process preferably uses "meta-data" (information) that is associated with the data array to determine whether a data block to be processed is similar to a block that is already in the local memory of the processing device or not. As will be discussed further below, using meta-data associated with the data array for this purpose reduces the burden on the processing device and can provide a particularly effective mechanism for reducing the number of read transactions in use.

Any suitable form of meta-data (information) that can be used by the processing device to determine if the data blocks should be considered to be similar or not can be used (and associated appropriately with the stored array of data).

For example, the meta-data could comprise, and in one preferred embodiment does comprise, information to allow the processing device itself to assess whether the data blocks should be considered to be similar to each other or not.

In one preferred such embodiment, the information (meta-data) that is associated with the array of data and that is to be used to determine if the blocks of data are similar or not comprises information representative of and/or derived from the content of the data blocks in question. In this case, the similarity determination process preferably then determines whether the respective data blocks are similar or not by comparing information representative of and/or derived from the content of the new data block with information representative of and/or derived from the content of the data block that is already stored in the local memory.

The information representative of the content of each data block in these arrangements may take any suitable form, but is preferably based on or derived from the content on the data block. Most preferably it is in the form of a "signature" for the data block which is generated from or based on the content of the data block. Such a data block content "signature" may comprise, e.g., and preferably, any suitable set of derived information that can be considered to be representative of the content of the data block, such as a checksum, a CRC, or a hash value, etc., derived from (generated for) the data block. Suitable signatures would include standard CRCs, such as CRC32, or other forms of signature such as MD5, SHA-1, etc.

Thus, in one particularly preferred embodiment, a signature indicative or representative of, and/or that is derived from, the content of the data block is generated for each data block that is to be compared, and the similarity determination process compares the signatures of the respective data blocks to determine if the blocks are similar or not.

It would, e.g., be possible to generate a single signature for an, e.g., RGBA, data block (e.g. rendered tile), or a separate signature (e.g. CRC) could be generated for each colour plane. Similarly, colour conversion could be performed and a separate signature generated for the Y, U, V planes if desired.

As will be appreciated by those skilled in the art, the longer the signature that is generated for a data block is (the more accurately the signature represents the data block), the less likely it is that there will be a false "match" between signatures (and thus, e.g., the erroneous non-reading of a new data block). Thus, in general, a longer or shorter signature (e.g. CRC) could be used, depending on the accuracy desired (and as a trade-off relative to the memory and processing resources required for the signature generation and processing, for example).

The signatures could also be weighted towards a particular aspect or aspects of the content of the data blocks to allow, e.g., a given overall length of signature to provide better overall results by weighting the signature to those parts of the data block content (data) that will have more effect on the overall output (e.g. as perceived by a viewer of the image that the data array represents).

It would also be possible to use different length signatures for different applications, etc., depending upon the, e.g., application's, e.g., display, requirements. This may further help to reduce power consumption. Thus, in a preferred embodiment, the length of the signature that is used can be varied in use. Preferably the length of the signature can be changed depending upon the application in use (can be tuned adaptively depending upon the application that is in use).

In a particularly preferred arrangement of these embodiments, the data block signatures are "salted" (i.e. have another number (a salt value) added to the generated signature value) when they are created. The salt value may conveniently be, e.g., the data array (e.g. frame) number since boot, or a random value. This will, as is known in the art, help to make any error caused by any inaccuracies in the signature comparison process non-deterministic (i.e. avoid, for example, the error always occurring at the same point for repeated viewings of a given sequence of images such as, for example, where the process is being used to display a film or television programme).

In the above arrangements, the similarity determination process uses meta-data (information) associated with two (or more) data blocks to determine whether a new data block to be processed is similar to a data block that is already stored in the local memory of the processing device.

However, in another particularly preferred embodiment, the meta-data (information) that is associated with the data array is in the form of similarity information that indicates directly whether a given data block in the data array is similar to another block in the data array. In this case, the processing device can simply read the meta-data to determine if a new data block is to be considered to be similar to a data block that is already stored in the local memory of the processing device or not: there is no need for the processing device to carry out any form of similarity assessment of the blocks themselves using the meta-data. This reduces the processing requirements on the processing device during the data array processing operation.

Thus, while in one preferred embodiment the information (meta-data) that is associated with the array of data in the first (main) memory comprises information that can be used to assess the similarity between respective data blocks (such as data block "signatures", as discussed above), in a particularly preferred embodiment, this information (meta-data) comprises information indicating (directly) whether a respective data block can be considered to be similar to another data block in the data array or not.

Where the meta-data indicates directly whether a data block can be considered to be similar to another data block in the data array or not, the meta-data can take any suitable and desired form to do that. It could, for example, comprise a hierarchical quad-tree. In a preferred embodiment it is in the form of a (2D) bitmap.

In one particularly preferred such embodiment, the meta-data (e.g. bit-map) represents the data blocks to be read from the data array and each meta-data (e.g. bitmap) entry indicates for a corresponding data block whether that data block is similar to another data block in the data array or not. Most preferably each data block position in the data array has associated with it a meta-data entry indicating whether that block is similar to another block (or not). In this case, the similarity determination process need simply read the relevant meta-data entry for the data block position in question to determine whether the data block is similar to a data block that is already stored in the local memory of the processing device or not.

Thus, in a particularly preferred embodiment, the data array has associated with it meta-data, such as a bitmap, indicating for each respective data block in the data array whether that data block is similar to another data block in the data array, and the similarity determination process (processing device) determines whether a new data block to be processed is similar to a data block that is already stored in the local memory of the processing device using the relevant meta-data for the new data block.

In these arrangements, the meta-data can be constructed and arranged as desired. For example, it could and in one preferred embodiment does, simply indicate whether a data block is similar to the immediately preceding data block in the data array or not. In this case each meta-data entry need comprise only a single-bit, with one value (e.g. "1") indicating that the corresponding block is similar to the immediately preceding block and the other value (e.g. "0") indicating that it is not.

To facilitate this, the data blocks should be processed in a particular, predefined order (both for writing them to the data array and reading them from that array). Preferably an order that can exploit any spatial coherence between the blocks is used.

It would also be possible to use a more sophisticated meta-data arrangement, for example where data blocks are not just considered in relation to their immediately preceding data block but in relation to more than one data block in the data array. In this case the meta-data (e.g. bitmap entry) associated with each respective block position should indicate not only that the corresponding data block is similar to another data block in the data array but also which data block in the data array it is similar to. In this case the meta-data (e.g. bitmap entry) associated with each data block position will be larger than a single bit as more information is being conveyed for each block position. The actual size of the meta-data entries will depend, e.g., on how many data blocks in the data array each data block is to be compared with for similarity purposes (as that then determines how many possible similar block permutations each meta-data entry has to be able to represent).

In these arrangements, each similarity value (meta-data entry) can, e.g., give a relative indication of which other data block in the data array the data block in question is similar to (such that, e.g., "001" indicates the previous data block relative to the current data block), or an absolute indication of which other data block in the data array the data block in question, is similar to (such that, e.g., meta-data "125" indicates the block is similar to the 125th data block in the data array in question).

The choice of the size of the meta-data entries will be a trade-off or optimisation between the overhead for preparing and storing the meta-data and the potentially greater number of read transactions that will be eliminated if the meta-data can indicate similarity to a greater number of other data blocks in the data array. The choice of the meta-data arrangement to use can therefore be made based, e.g., on these criteria and, e.g. the expected or anticipated use or implementation conditions of the system. (It should also be noted here that the use of meta-data in the manner of the present embodiments can facilitate using much smaller data block sizes (such as at the level of cache lines), as the meta-data overhead per data block can be relatively small.)

In these arrangements, it would also be possible to include with each meta-data entry a "likeness" value that indicates how similar the respective data blocks are. The similarity determination process could then, e.g., use this likeness value to determine whether to read a new block from the data array or to re-use the already existing similar data block in the local memory of the processing device in use. For example, the similarity determination process could set a likeness value threshold, and compare the likeness value for a new data block to that threshold and read in the new data block or not, accordingly. This would then allow the read process to be modified, e.g. to provide for a more or less accurate data array reading process, in use, for example by varying the likeness value threshold in use.

In a further preferred embodiment, the meta-data (similarity information) that is associated with the data array is in the form of a command list that instructs the processing device to read the data blocks into the local memory of the processing device according to their relative similarities. For example, a command list could be prepared that, for example, says read block 1 into the local memory of the processing device, repeat that block for the next three blocks, then read in the 5th data block from the data array into the local memory, repeat that block once, evict the first data block from the local memory, read in the 7th block from the data array, read in and process the 8th block from the data array, and so on. Such a command list could be generated directly, or, for example, a similarity bitmap could first be generated and then parsed to create a command list that is then stored for the data array.

Where similarity meta-data (information) is associated with the data array, it will be necessary to also generate the necessary meta-data that is to be associated with the data array. The technology described in this application also extends, in its preferred embodiments at least, to the generation of the meta-data.

The meta-data may be generated and associated with the data array in any desired and suitable manner. It is preferably generated as the data array is being generated. In one preferred embodiment the meta-data is generated by the device that is generating the data array (which device may, as discussed above, be a graphics processor, a video processor, a camera controller (processing data generated by the camera's sensor), or a CPU, for example).

Where the meta-data comprises content "signatures" for each data block, those signatures could be generated as the data blocks are generated and then stored in association with the generated data blocks in an appropriate manner.

In the case where the meta-data indicates directly whether a data block can be considered to be the same as another data block, such as the "similarity" bitmap discussed above, then the data array generation process preferably includes comparing the blocks of data as they are generated and generating the similarity information, e.g., bitmap, accordingly.

In this case, the data block comparison could be done, e.g., by comparing information, such as the signatures discussed above, representative of and/or derived from the content of a data block with information representative of and/or derived from the content of another data block, so as to assess the similarity or otherwise of the data blocks.

However, in a particularly preferred embodiment, the actual content of the blocks (rather than some representation of their content) is compared to determine if the blocks are to be considered to be similar or not. To do this, some or all of the content of a data block of the data array may be compared with some or all of the content of another data block (or blocks) of the data array. Comparing some or all of the actual content of the data blocks may reduce complexity and reduce errors in the comparison process.

The comparison process preferably uses some form of threshold criteria to determine if a block should be considered to be similar to another block or not. For example, and preferably, if a selected number of the bits of the respective block's contents match, the blocks are considered to be similar. Preferably there is some maximum visual deviation between the blocks that is permitted (where the data array represents an image).

Most preferably, a maximum deviation, such as an amount of differences in the LSB of the pixels, is allowed before blocks are considered not to be similar. Preferably this threshold, e.g. maximum content deviation, can be varied (e.g. programmed) in use. It could, for example, be set per application, based on the proportion of static and dynamic frame data, and/or based on the power mode (e.g. low power mode or not) in use, etc.

In one particularly preferred embodiment, the blocks of data that are considered each comprise one cache line of the local memory of the processing device, or a 2D sub-tile of the data array (where the array is made up of separate tiles, such as would be the case for a tile-based graphics processing system). These are particularly effective implementations because they use units of stored data that can be efficiently manipulated by the processing elements of, and that can be fetched efficiently from memory by, a processing device that is to process the data array.

In a graphics processing system, in one preferred embodiment each data block corresponds to a rendered tile that the graphics processor produces as its rendering output. This is beneficial, as the graphics processor will generate the rendering tiles directly, and so there will be no need for any further processing to "produce" the data blocks that will be considered and compared.

In these arrangements, the (rendering) tiles that the render target (the data array) is divided into for rendering purposes can be any desired and suitable size or shape. The rendered tiles are preferably all the same size and shape, as is known in the art, although this is not essential. In a preferred embodiment, each rendered tile is rectangular, and preferably 8×8, 16×16 or 32×32 sampling positions in size.

In another particularly preferred embodiment, data blocks of a different size and/or shape to the tiles that the rendering process operates on (produces) may be, and preferably are, used.

For example, in a preferred embodiment, a or each data block that is considered and compared may be made up of a set of plural "rendered" tiles, and/or may comprise only a sub-portion of a rendered tile. In these cases there may be an intermediate stage that, in effect, "generates" the desired data block from the rendered tile or tiles that the graphics processor generates.

In one preferred embodiment, the same block (region) configuration (size and shape) is used across the entire array of data. However, in another preferred embodiment, different block configurations (e.g. in terms of their size and/or shape) are used for different regions of a given data array. Thus, in one preferred embodiment, different data block sizes may be used for different regions of the same data array.

In a particularly preferred embodiment, the block configuration (e.g. in terms of the size and/or shape of the blocks being considered) can be varied in use, e.g. on a data array (e.g. output frame) by data array basis. Most preferably the block configuration can be adaptively changed in use, for example, and preferably, depending upon the number or rate of read (and/or write) transactions that are being eliminated (avoided). For example, and preferably, if it is found that using a particular block size only results in a low probability of a block not needing to be read from the main memory, the block size being considered could be changed for subsequent arrays of data (e.g., and preferably, made smaller) to try to increase the probability of avoiding the need to read blocks of data from the main memory.

Where the data block size is varied in use, then that may be done, for example, over the entire data array, or over only particular portions of the data array, as desired.

A data block can be compared with one, or with more than one, other data block. Preferably the comparison is done by storing the respective blocks in an on-chip buffer/cache.

In one preferred embodiment, a data block is compared with a single stored data block only, preferably its immediately preceding data block in the data array.

In another preferred embodiment, a data block is compared to plural other data blocks of the data array. This may help to further reduce the number of data blocks that need to be read from the data array, as it may allow the reading of data blocks that are similar to data blocks in other positions in the data array to be eliminated.

Where a data block is compared to plural other data blocks of the data array, then while each data block could be compared to all the data blocks of the data array, preferably each data block is only compared to some, but not all, of the other data blocks of the data array, such as, and preferably, to those data blocks in the same area of the data array as the data block in question (e.g. those data blocks covering and surrounding the position of the data block). This will provide an increased likelihood of detecting data block matches, without the need to check all the data blocks in the data array. Most preferably a data block is compared to the data blocks on the same line in the data array (in the order that the blocks are being generated in).

It would also be possible to vary the number of other data blocks that each data block is compared with in use, e.g. on a frame-by-frame basis. Varying the data block comparison search depth would allow the meta-data width to be varied.

In one preferred embodiment, each and every data block of the data array is compared with another data block or blocks. However, this is not essential, and so in another preferred embodiment, the comparison is carried out in respect of some but not all of the data blocks of a given data array (e.g. output frame).

In a particularly preferred embodiment, the number of data blocks that are compared with another data block or blocks for respective data arrays is varied, e.g., and preferably, on a data array by data array (e.g. frame-by-frame), or over sequences of data arrays (e.g. frames), basis. This is preferably based on the expected correlation (or not) between successive data arrays (e.g. frames).

Thus the meta-data generation process preferably comprises means for or a step of selecting the number of the data blocks in the data array that are to be compared with another data block or blocks for a given data array.

In a particularly preferred embodiment, the number of data blocks that are compared can be, and preferably is, different for different regions of the data array.

In a preferred embodiment, it is possible for a software application (e.g. that is triggering the generation of the data array) to indicate and control which regions of the data array the data block comparison process should be performed for. This would then allow the comparison process to be "turned off" by the application for regions of the data array the application "knows" will always be different.

This may be achieved as desired. In a preferred embodiment registers are provided that enable/disable data block (e.g. rendered tile) comparisons for data array regions, and the software application then sets the registers accordingly (e.g. via the graphics processor driver).

As discussed above, it is believed that the generation of "similarity" meta-data for data blocks of an array of data to be processed may be new and advantageous in its own right.

Thus, according to a further aspect of the technology described in this application, there is provided a method of generating meta-data for use when processing array of data that is stored in memory, the method comprising:

for each of one or more blocks of data representing particular regions of an array of data to be processed:

determining whether the block of data should be considered to be similar to another block of data for the data array; and storing similarity information indicating whether the block of data was determined to be similar to another block of data for the data array in association with the array of data.

According to a further aspect of the technology described in this application, there is provided a data processing system, comprising:

a data processor for generating an array of data for processing;

means for determining for each of one or more blocks of data representing particular regions of the array of data whether the block of data should be considered to be similar to another block of data for the data array; and means for storing similarity information indicating whether a block of data was determined to be similar to another block of data for the data array in association with the array of data.

According to a further aspect of the technology described in this application, there is provided a data processor comprising:

means for generating an array of data for processing;

means for determining for each of one or more blocks of data representing particular regions of the array of data whether the block of data should be considered to be similar to another block of data for the data array; and means for storing similarity information indicating whether a block of data was determined to be similar to another block of data for the data array in association with the array of data.

As will be appreciated by those skilled in the art, these aspects and embodiments of the technology described in this application can and preferably do include any one or more or all of the preferred and optional features of the technology described herein, as appropriate. Thus, for example, the similarity indicating information is preferably in the form of a bitmap that is associated with the array of data. The similarity of the data blocks is preferably determined by comparing the data blocks, preferably by comparing their content directly. The array of data is preferably data representing an image, and the data processor (the data array generating processor) is preferably a graphics processor (but it may also be a video processor or a CPU, for example).

Preferably in these aspects and arrangements, the system generates, as discussed above, the output data array together with a set of associated similarity information (meta-data) indicating which regions (blocks) in the output data array are the same (can be considered to be similar).

Most preferably the entire data array is divided into appropriate data blocks and it is determined for each data block that the data array is divided into, whether that data block is similar to another data block of the data or not (and similarity information stored for the data block accordingly).

In a particularly preferred embodiment, the similarity information is generated as the data array is being written to the memory (i.e. as the data array is being generated). This avoids the need to process the data array once it has been generated to generate the similarity information. In this case, the data array is preferably generated by writing data to the data array in blocks, and as each new block is generated for writing to the array, it is preferably determined whether that block is similar to another block that has already been generated for the data array and its similarity information (meta-data) generated accordingly.

Thus, in a particularly preferred embodiment, the array of data is stored in memory (e.g. the frame buffer) by writing blocks of data representing particular regions of the array of data to the stored array in memory, and when a new block of data is generated for the data array, it is determined whether that new block of data should be considered to be similar to a block of data that has already been generated for the data array, and the similarity information indicating whether that new block of data was determined to be similar to a block of data that had already been generated for the data array is generated and stored in association with the array of data accordingly.

In these arrangements, the data blocks are preferably buffered or cached in a local memory for the similarity information generation process, to avoid having, e.g., to read blocks from the main memory where the data array is to be stored in order to generate the similarity information.

It would also or instead be possible, e.g., to generate "signatures" (as discussed above) for blocks of data as the array is generated, and then use the signatures to generate further similarity information, such as a similarity bitmap, for the data array.

In the above aspects and embodiments, the meta-data (information), such as the block similarity bitmap and/or signatures for the data blocks, that is associated with the data array and that is to be used when the data array is processed should be stored appropriately. In a preferred embodiment it is stored with the data array in memory (in the first memory). However, this need not be the case, and the similarity meta-data could if desired be stored in a different location to the array of data, such as any other suitable location in the system. Indeed, as the similarity meta-data may be relatively small, it could, e.g., be stored in an on-chip memory or buffer, rather than in off-chip memory, if desired.

When the meta-data is to be used, it can be retrieved appropriately by the processing device. Preferably the meta-data, e.g. signatures, for one or more data blocks, and preferably for a plurality of data blocks is cached locally to the processing device, e.g. on the processing device itself, for example in an on-chip meta-data, e.g. signature, buffer. This may avoid the need to fetch the meta-data from an external memory every time a block similarity assessment is to be made, and so help to reduce the memory bandwidth used for reading the meta-data.

Most preferably, the meta-data for a data array that is being processed is retrieved (read) in portions (corresponding to plural blocks of the data array) in advance of the reading and processing of the data blocks to which it relates. Thus, the similarity meta-data (information) is preferably pre-fetched for the reading process. This can allow the similarity determination to be performed more rapidly.

Where the meta-data, such as data block signatures, is cached locally on the processing device, e.g., stored in an on-chip buffer, then the data blocks are preferably processed in a suitable order, such as a Hilbert order, so as to increase the likelihood of matches with the data block(s) whose meta-data is cached locally (stored in the on-chip buffer).

Although, as will be appreciated by those skilled in the art, the generation and storage of meta-data for data blocks (e.g. rendered tiles) will require some processing and memory resource, the Applicants believe that this will be outweighed by the potential savings in terms of power consumption and memory bandwidth that can be provided by then using that data in the manner discussed above.

As will be appreciated by those skilled in the art, in a particularly preferred embodiment, the generated data array and meta-data is then read and used by a processing device in the manner discussed above.

Thus, according to a further aspect of the technology described in this application, there is provided a method of processing an array of data, the method comprising:

generating an array of data to be processed;

for each of one or more blocks of data representing particular regions of the array of data to be processed:

determining whether the block of data should be considered to be similar to another block of data of the data array; and generating similarity information indicating whether the block of data was determined to be similar to another block of data of the data array;

storing the array of data and its associated generated similarity information in a first memory;

reading blocks of data each representing particular regions of the array of data from the first memory and storing them in a memory of a processing device that is to process the data array, prior to the blocks of data being processed by the processing device;

using the similarity information generated for the data array to determine whether a block of data to be processed for the data array is similar to a block of data that is already stored in the memory of the processing device; and either processing for the block of data to be processed a block of data that is already stored in the memory of the processing device, or a new block of data from the array of data stored in the first memory, on the basis of the similarity determination According to another aspect of the technology described in this application, there is provided a data processing system, comprising:

a first memory for storing an array of data to be processed;

a data processor for generating an array of data to be processed;

means for determining for each of one or more blocks of data representing particular regions of the array of data whether the block of data should be considered to be similar to another block of data of the data array;

means for generating similarity information indicating whether the block of data was determined to be similar to another block of data of the data array;

means for storing the array of data and its associated generated similarity information in the first memory; and a processing device for processing the array of data stored in the first memory, by processing successive blocks of data, each representing particular regions of the array of data, the processing device having a local memory;

a read controller configured to read blocks of data representing particular regions of an array of data that is stored in the first memory and to store the blocks of data in the local memory of the processing device prior to the blocks of data being processed by the processing device; and control circuitry configured to use the similarity information generated for the data array to determine whether a block of data to be processed for the data array is similar to a block of data that is already stored in the memory of the processing device, and to cause the processing device to process for the block of data to be processed either a block of data that is already stored in the memory of the processing device, or a new block of data from the array of data stored in the first memory, on the basis of the similarity determination.

As will be appreciated by those skilled in the art, these aspects and arrangements can, and preferably do, include one or more or all of the preferred and optional features of the technology described in this application discussed herein, as appropriate.

Although as discussed above the present aspects of the technology described in this application are particularly concerned with the process of reading data from memory for use, as discussed above the Applicants have recognised that the principles of the present aspects of the technology described in this application can also be used to improve the process of writing the data array to memory in the first place. For example, and in particular, the Applicants have recognised that if a data block is determined to be sufficiently similar to a block that has already been generated for the data array then it may be unnecessary to also store the new data block in the data array.

Thus, in a particularly preferred embodiment, when the data blocks for the data array are being written to the data array in memory, a completed data block (e.g. rendered tile) is not written to the data array in memory if it has been determined that that data block should be considered to be similar to a data block that has already been generated for the data array (i.e. that will already be stored in the data array). This thereby avoids writing to the data array a data block that has been determined to be the same as a data block that will already be stored in the data array.

In this case therefore, as each data block to be written to the data array is generated, it may be compared with another data block or blocks of the data array and the new data block then written or not to the data array on the basis of that comparison.

Thus, in a particularly preferred embodiment, there is a step of or means for, when a data block for the data array has been completed, comparing that data block to at least one other data block of the data array, and determining whether or not to write the completed data block to the data array on the basis of the comparison.

This process preferably uses the same block comparison arrangements as discussed above to determine if the blocks are similar, such as comparing signatures representative of the content of the data blocks, or, most preferably, comparing the content of the blocks directly.

In these arrangements, although the data blocks themselves may not be written to the data array, the similarity meta-data should still be generated and stored for the block position in question, as that information will be needed to determine which other block of the data array should be processed by the processing device instead.

In one preferred embodiment of these arrangements, the write elimination process is performed in respect of (by comparing) blocks being generated for the same data array (the current data array) only.

However, as discussed above the comparison could be extended to include data blocks from a previous data array that is already stored in the memory (e.g. frame buffer) so as to avoid having to write a similar data block again to the memory for the data array if it is already present in the memory from a previous data array. This may particularly be useful where a series of similar data arrays (such as frames of a video sequence) is being generated. In this case, a newly generated data block could be compared (e.g. based on its content or a content signature) with a block or blocks of a data array that is already stored in the memory.

In these arrangements, the system is preferably configured to always write a newly generated data block to the data array in memory periodically, e.g., once a second, in respect of each given data block (data block position). This will then ensure that a new data block is written into the data array at least periodically for every data block position, and thereby avoid, e.g., erroneously matched data blocks (e.g. because the data blocks' signatures happen to match even though the data blocks' content actually varies) being retained in the data array for more than a given, e.g. desired or selected, period of time. This may be done, e.g., by simply writing out an entire new data array periodically (e.g. once a second), or by writing new data blocks out to the data array on a rolling basis in a cyclic pattern, so that over time all the data block positions are eventually written out as new.

In a particularly preferred embodiment, the technology described in this application is used in conjunction with another power and bandwidth reduction scheme or schemes, such as, and preferably, a data array (e.g. frame buffer) compression scheme (which may be lossy or loss-less, as desired).

As discussed above, although the present techniques have particular application to graphics processor operation, the Applicants have recognised that they can equally be applied to other systems that process data in the form of blocks in a similar manner to, e.g., tile-based graphics processing systems, and that, for example, read frame buffers, textures and/or images. Thus, they may, for example, be applied to a host processor manipulating the frame buffer, a graphics processor reading a texture, a composition engine reading images to be composited, or a video processor reading reference frames for video decoding. Thus the present techniques may equally be used, for example, for video processing (as video processing operates on blocks of data analogous to tiles in graphics processing), and for composite image processing (as again the composition frame buffer will be processed as distinct blocks of data). They may also be used, e.g., where digital cameras are processing data (images) generated by the camera's sensor, and when processing, e.g., for display, data (images) generated by digital cameras.

The present techniques may also be used where there are plural master devices each writing to the same data array, e.g., frame in a frame buffer. This may be the case, for example, when a host processor generates an "overlay" to be displayed on an image that is being generated by a graphics processor.

In this case, each device writing to the data array could update the similarity meta-data accordingly, or, e.g., the meta-data for those parts of the data array that another master is writing to could be invalidated or cleared (so that those parts of the data array will be read out in full to the processing device). The latter would be necessary where a given master device is unable to update the similarity meta-data. It would also be possible to invalidate (clear) the meta-data for the entire data array if, e.g., another master modifies a relatively large portion of the data array (or modifies the data array at all).

More particularly, in the case where there is a "third party" device that is also reading and/or writing to the data array, then in the case where only read elimination is being employed, the third party device when reading from the data array could simply read the data array normally without using (or, indeed, without knowing about) the similarity meta-data, or the third party device could use the meta-data to eliminate read transactions.

Where the third party device is writing to the data array, then it could either update the meta-data associated with the data array, or a portion or the entirety of the similarity meta-data for the data array could be invalidated. In the latter case there could, for example, be a data array meta-data invalidate bit at the very start of the meta-data.

Where both read and write transaction elimination is being used, then in the case of reading from the data array, the third party device will use the similarity meta-data to eliminate read transactions. (Unlike in the case where only read elimination is being used and therefore a third party device reading the data array may or may not use the meta-data to eliminate reads, as desired, in the case where write elimination is enabled, the third party device must read and use the meta-data when reading from the data array because as write elimination has been used, the data array may not be "complete" (because in the case of a data block whose writing to the data array has been "eliminated", the reading device will have to determine from the meta-data which block to use instead).)

In the case of writing to the data array in this case, then as for the case above where only read elimination is enabled, the third party device could when writing data to the data array either update the meta-data, or a portion of or the entirety of the meta-data could be invalidated.

The meta-data generation process (and data block comparison process where used) may be performed as desired. In one preferred embodiment it is performed by the data array generating processor (e.g. GPU, CPU, etc.) itself but in another preferred embodiment there is a separate block or hardware element (logic) that does this that is intermediate the data array generation process and the memory (e.g. frame buffer) where the data array is to be stored. In the case where the meta-data generation "unit" is separate (external) to the data array generating processor, it may reside as a separate logic block, or be part of the bus fabric and/or interconnect, for example.

Thus, in one preferred embodiment, there is a meta-data generation hardware element (logic) that is separate to the data array generating processor (e.g. graphics processor), and in another preferred embodiment the meta-data generation logic is integrated in (part of) that processor. Thus, in one preferred embodiment, the meta-data generating means, etc., will be part of the data generating processor (e.g. the graphics processor) itself, but in another preferred embodiment, the system will comprise a data generating processor, and a separate "meta-data generation" unit or element.

The technology described in this application also extends to the provision of a particular hardware element for performing the comparison and consequent similarity meta-data determination. As discussed above, this hardware element (logic) may, for example, be provided as an integral part of a, e.g., graphics processor, or may be a standalone element that can, e.g., interface between a graphics processor, for example, and an external memory controller. It may be a programmable or dedicated hardware element.

Thus, according to a further aspect of the technology described in this application, there is provided meta-data generation apparatus for use in a data processing system in which an array of data generated by the data processing system is read from an output buffer by reading blocks of data representing particular regions of the array of data from the output buffer, the apparatus comprising:

means for comparing a block of data for the data array with at least one other block of data for the data array, and for generating information indicating whether or not the block of data is to be considered to be similar to another block of data of the data array on the basis of the comparison; and means for storing that similarity information in association with the data array.

As will be appreciated by those skilled in the art, these aspects and embodiments can and preferably do include any one or more or all of the preferred and optional features described herein. Thus, for example, the comparison preferably comprises comparing some or all of the contents of the respective data blocks.

The similarity determination process (and consequent data block selection process) may similarly be performed as desired. In one preferred embodiment it is performed by the processing device (e.g. display controller, GPU, CPU, etc.) itself, but in another preferred embodiment there is a separate block or hardware element (logic) that does this that is intermediate the data processing device and the memory (e.g. frame buffer) where the data array is stored. In the case where the similarity determination, etc., "unit" is separate (external) to the processing device, it may again reside as a separate logic block, or be part of the bus fabric and/or interconnect, for example.

Thus, in one preferred embodiment, there is a similarity determination hardware element (logic) that is separate to the data array processing device (e.g. display controller), and in another preferred embodiment the similarity determination logic is integrated in (part of) the data array processing device. Thus, in one preferred embodiment, the similarity determination means, etc., (the read controller and controller of the system) will be part of the processing device (e.g. display controller) itself, but in another preferred embodiment, the system will comprise a processing device, and a separate "similarity determination" unit or element (comprising the read controller and/or controller).

The technology described in this application also extends to the provision of a particular hardware element for performing the similarity and consequent data block determination. As discussed above, this hardware element (logic) may, for example, be provided as an integral part of a, e.g., display controller, or may be a standalone element that can, e.g., interface between a display controller, for example, and an external memory controller. It may be a programmable or dedicated hardware element.

Thus, according to a further aspect of the technology described in this application, there is provided a similarity determination apparatus for use when processing an array of data stored in a first memory, the apparatus comprising:

a read controller configured to read blocks of data representing particular regions of an array of data that is stored in the first memory and to store the blocks of data in a local memory of a processing device that is to process the array of data prior to the blocks of data being processed by the processing device; and a controller configured to determine whether a block of data to be processed for the data array is similar to a block of data that is already stored in the memory of the processing device, and to cause the processing device to process for the block of data to be processed either a block of data that is already stored in the memory of the processing device, or a new block of data from the array of data stored in the first memory, on the basis of the similarity determination.

As will be appreciated by those skilled in the art, these aspects and embodiments can and preferably do include any one or more or all of the preferred and optional features described herein. Thus, for example, the similarity determination is preferably based on similarity meta-data that is associated with the data array.

Various other preferred and alternative arrangements are possible. For example, in the case of a stereoscopic display, where left and right images are generated and used, respective "left" and "right" blocks to be displayed are preferably compared for the purpose of read (and, optionally, write) elimination (rather than comparing blocks for the "left" image of the frame only with blocks for the "left" image (and "right" blocks only with "right" blocks)). In other words, preferably left and right parts of the image are compared with each other as well as comparing blocks in the respective parts of the image with each other. This will help to further reduce the number of read transactions, as, as the Applicants have recognised, many of the left and right tiles in the image will be the same as each other. Similar arrangement can be (and preferably are) used for displays that use more than two images and for volume displays.

In a particularly preferred embodiment, the determined similarity information is also used to manage the storing of the data blocks in the local memory of the processing device and in particular as a factor in determining the eviction of data blocks from the local memory. For example, in one preferred embodiment the meta-data is used to determine a data block or blocks that is going to be used repeatedly by the processing device (e.g. used in a frame being displayed), and that data block (or blocks) is then temporarily locked in the local memory of the processing device (once it is written there) so that it will be available in the local memory when it is needed in the future. Thus, the meta-data is preferably used to try to identify in advance those data blocks that it would be advantageous to retain in the local memory of the processing device (where that is possible) and the local memory is then managed accordingly. This could be done, e.g., by counting how many other data blocks are noted as being similar to a given data block as the meta-data is being prepared. This information could then be used to control the storage of the data blocks in the processing device's local memory accordingly.

It would also be possible to keep a count of the number of times a given data block in the local memory is to be used in the near future (based, e.g., on meta-data that has been pre-fetched for the portion of the data array that is being processed), and to only allow a data block to be evicted from the local memory when its "use" count is zero.

Thus, in a particularly preferred embodiment, the eviction of data blocks from the local memory of the processing device is controlled, at least in part, in accordance with similarity meta-data that is associated with the data array in question.

The technology described in this application can be implemented in any suitable system, such as a suitably configured micro-processor based system. In a preferred embodiment, the technology described in this application is implemented in computer and/or micro-processor based system.

The various functions of the technology described in this application can be carried out in any desired and suitable manner. For example, the functions of the technology described in this application can be implemented in hardware or software, as desired. Thus, for example, the various functional elements and "means" of the technology described in this application may comprise a suitable processor or processors, Controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

In a preferred embodiment the graphics processor and/or transaction elimination unit is implemented as a hardware element (e.g. ASIC). Thus, in another aspect the technology described in this application comprises a hardware element including the apparatus of, or operated in accordance with the method of, any one or more of the aspects of the technology described in this application.

In a preferred embodiment the output data array generating processor and/or meta-data generation unit is implemented as a hardware element (e.g. ASIC). Thus, in another aspect the technology described in this application comprises a hardware element including the apparatus of, or operated in accordance with the method of, any one or more of the aspects of the technology described in this application.

It should also be noted here that, as will be appreciated by those skilled in the art, the various functions, etc., of the technology described in this application may be duplicated and/or carried out in parallel on a given processor.

Where used in a graphics processing system, the technology described in this application is applicable to any suitable form or configuration of graphics processor and renderer, such as processors having a "pipelined" rendering arrangement (in which case the renderer will be in the form of a rendering pipeline). It is particularly applicable to tile-based graphics processors and graphics processing systems.

As will be appreciated from the above, the technology described in this application is particularly, although not exclusively, applicable to 2D and 3D graphics processors and processing devices, and accordingly extends to a 2D and/or 3D graphics processor and a 2D and/or 3D graphics processing platform including the apparatus of, or operated in accordance with the method of, any one or more of the aspects of the technology described in this application. Subject to any hardware necessary to carry out the specific functions discussed above, such a 2D and/or 3D graphics processor can otherwise include any one or more or all of the usual functional units, etc., that 2D and/or 3D graphics processors include.

It will also be appreciated by those skilled in the art that all of the described aspects and embodiments of the technology described in this application can include, as appropriate, any one or more or all of the preferred and optional features described herein.

The methods in accordance with the technology described in this application may be implemented at least partially using software e.g. computer programs. It will thus be seen that when viewed from further aspects the technology described in this application provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The data processing system may be a microprocessor, a programmable FPGA (Field Programmable Gate Array), etc.

The technology described in this application also extends to a computer software carrier comprising such software which when used to operate a graphics processor, renderer or microprocessor system comprising data processing means causes in conjunction with said data processing means said processor, renderer or system to carry out the steps of the methods of the technology described in this application. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the technology described in this application need be carried out by computer software and thus from a further broad aspect the technology described in this application provides computer software and such software installed on a computer software carrier for carrying out at least one of the steps of the methods set out herein.

The technology described in this application may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of preferred embodiments of the technology described in this application will now be described by way of example only and with reference to the accompanying drawings, in which.

Figure 4A:
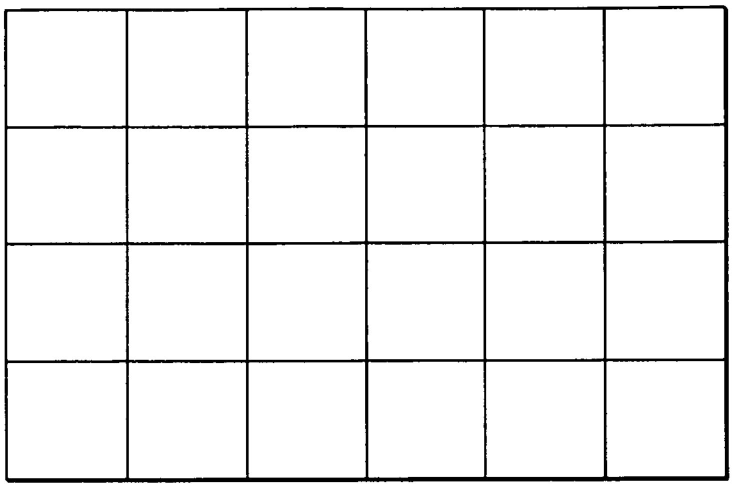
Figure 4B:
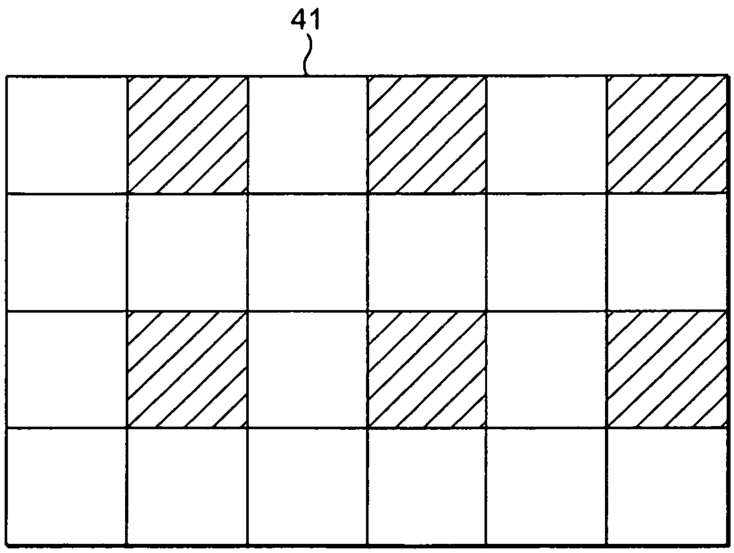
Figure 5:
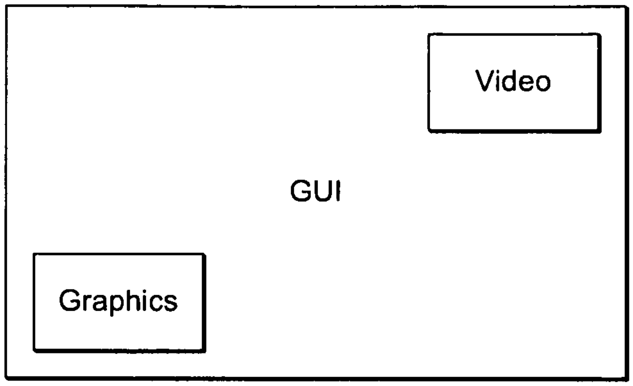
Figure 6:
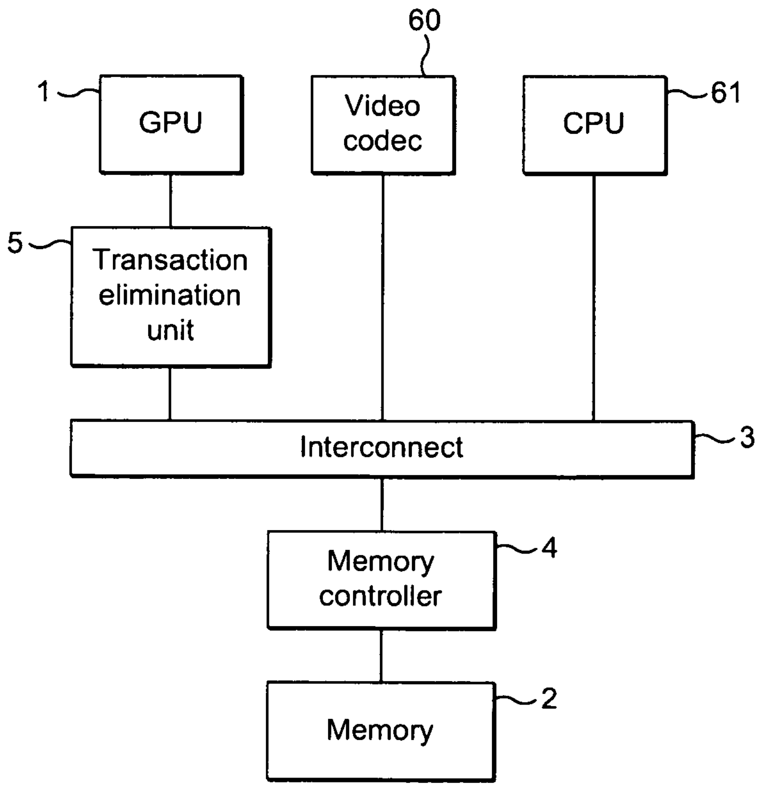
Figure 7:
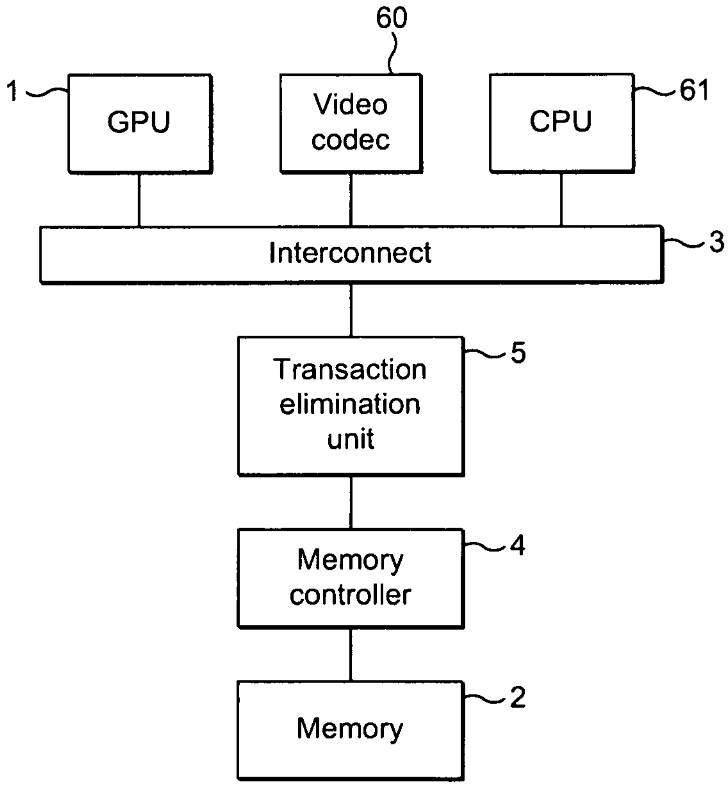
Figure 8:
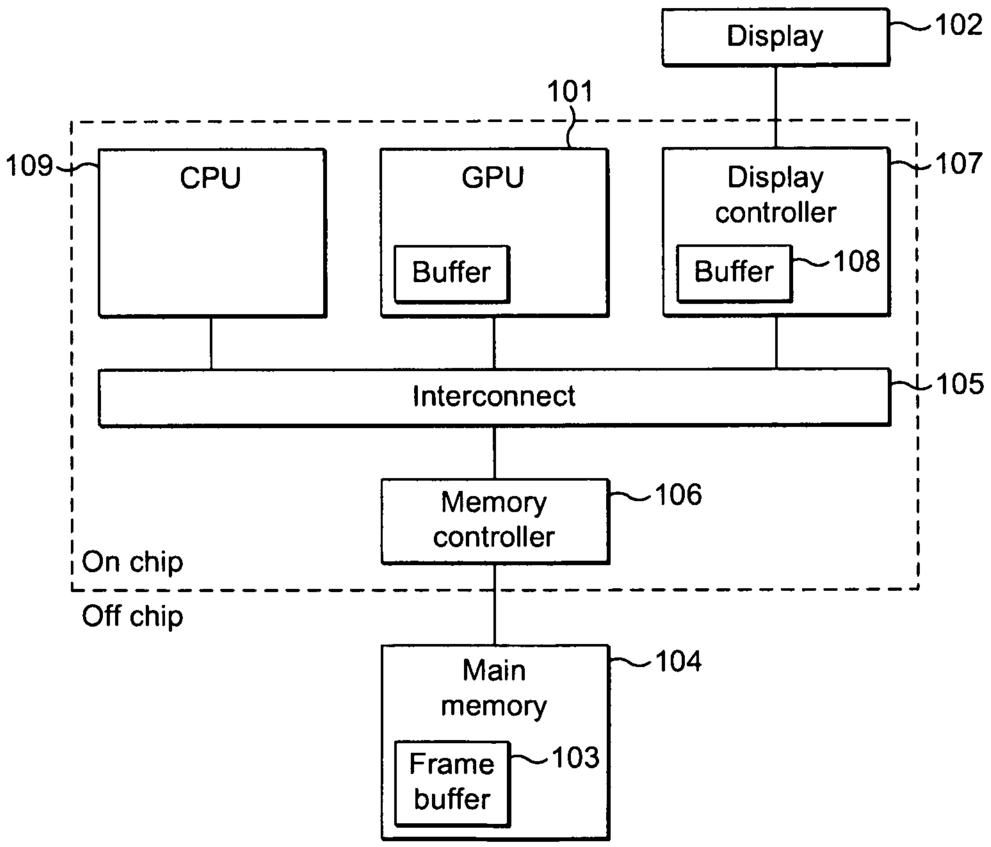
Figure 9:
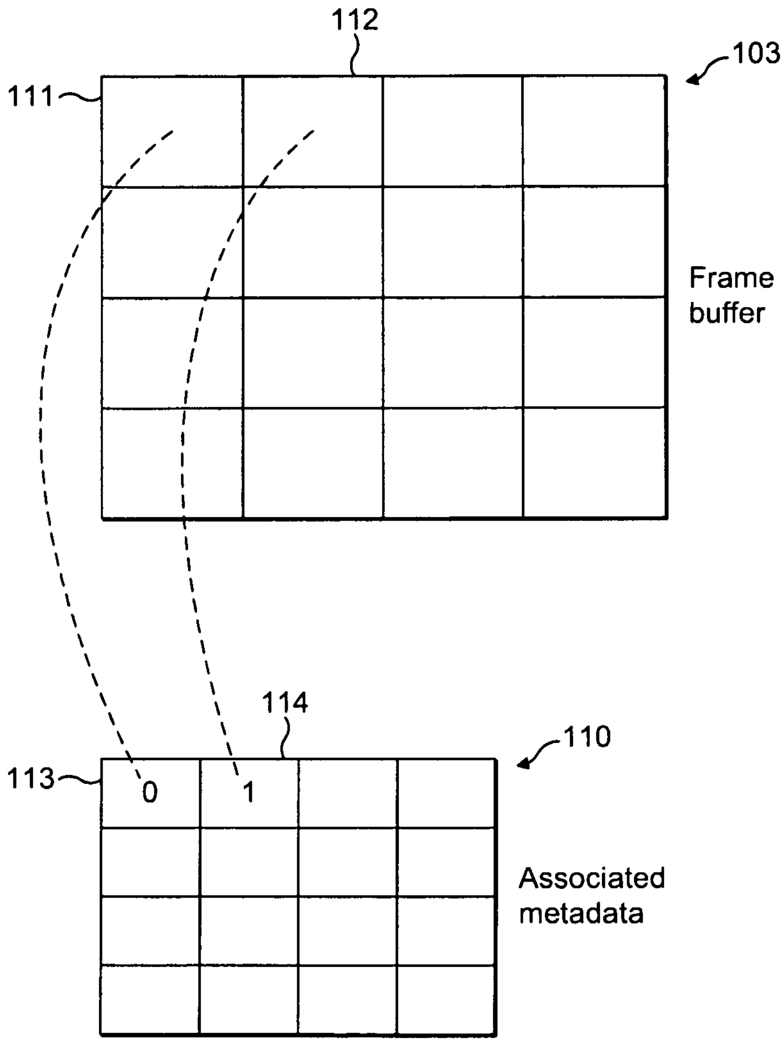
Figure 10:
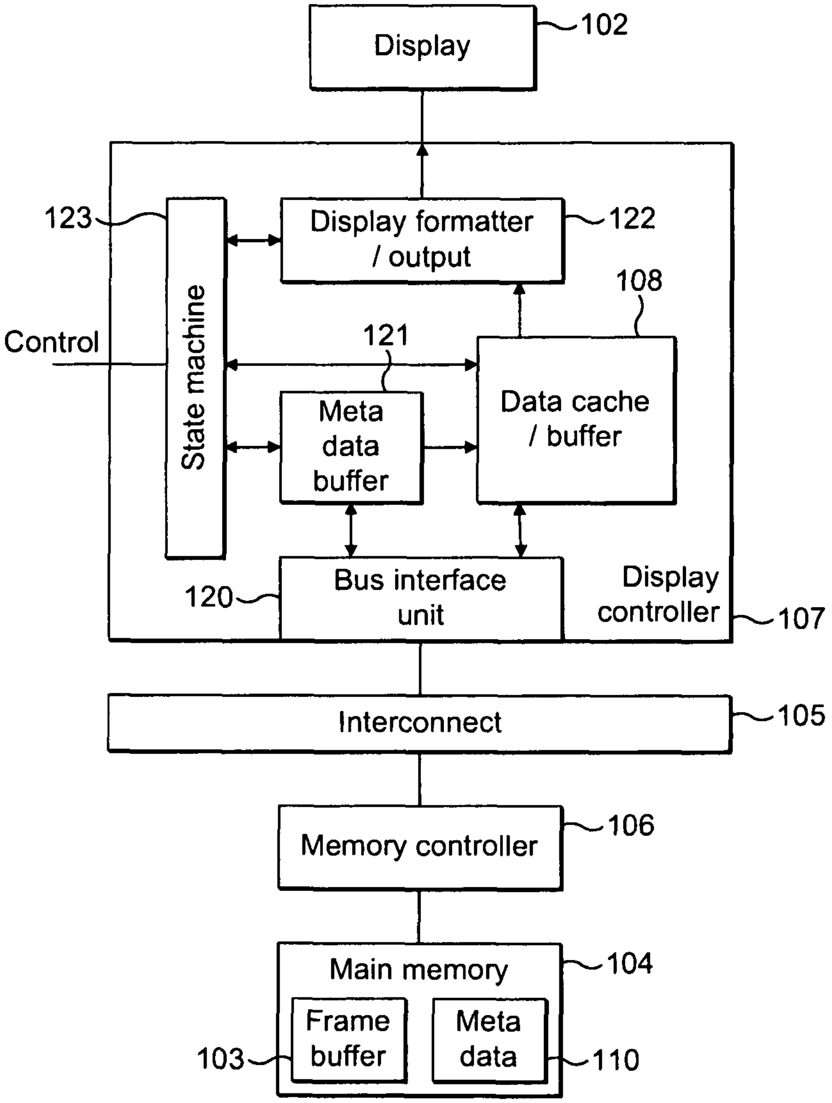
Figure 11:
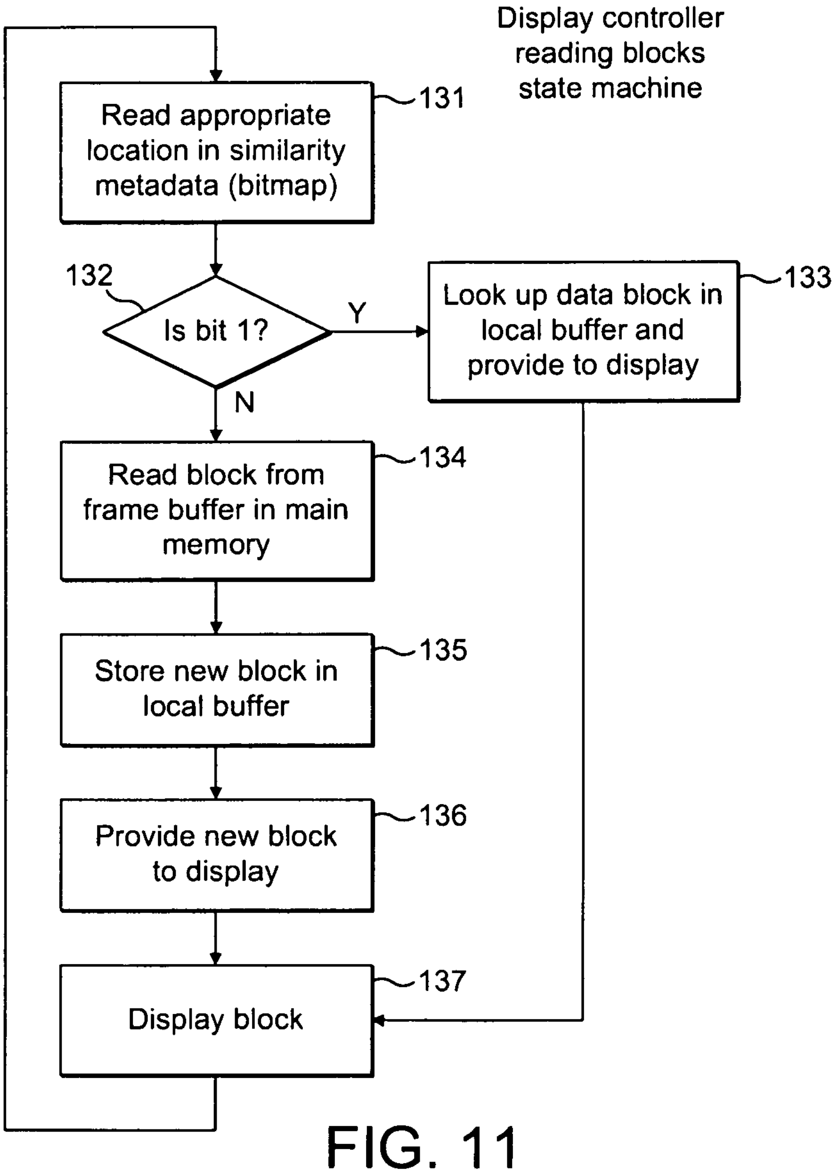
Figure 12:
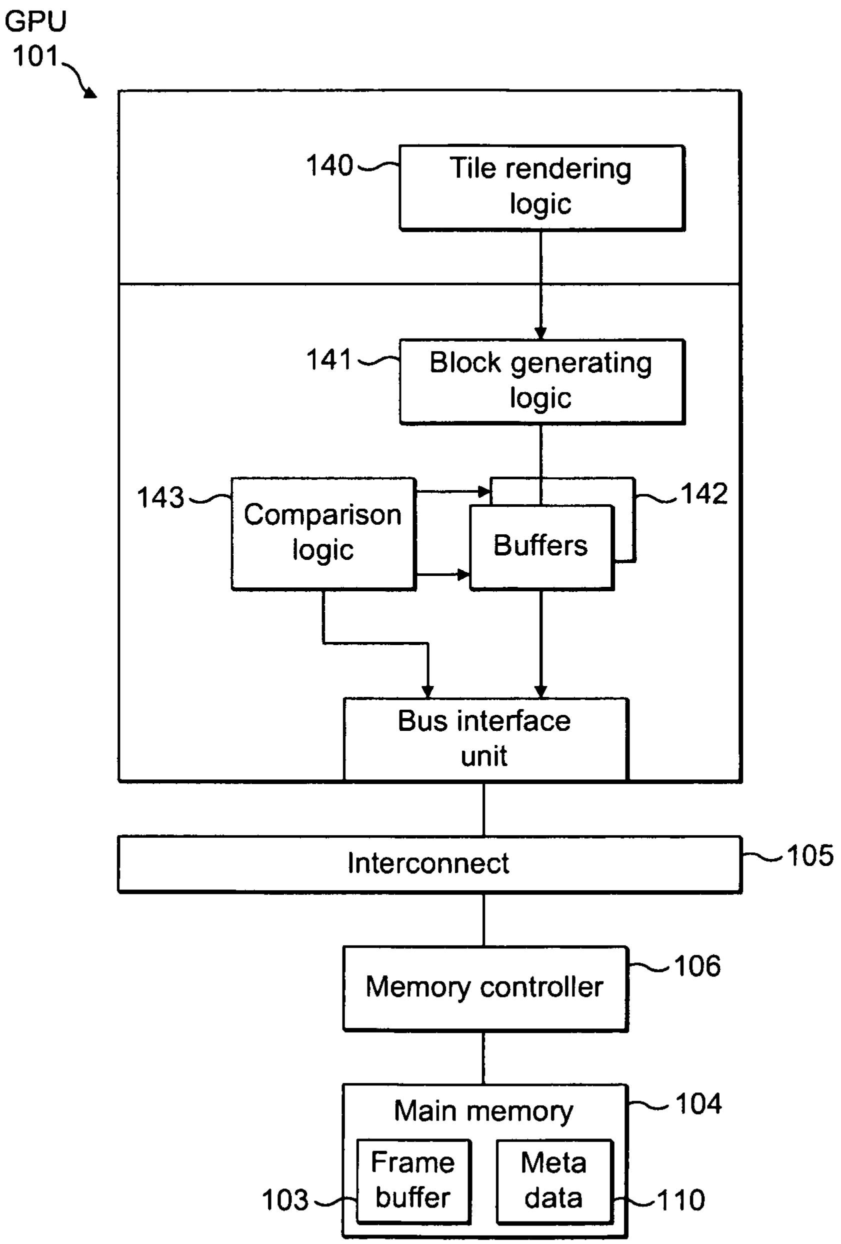
Figure 13:
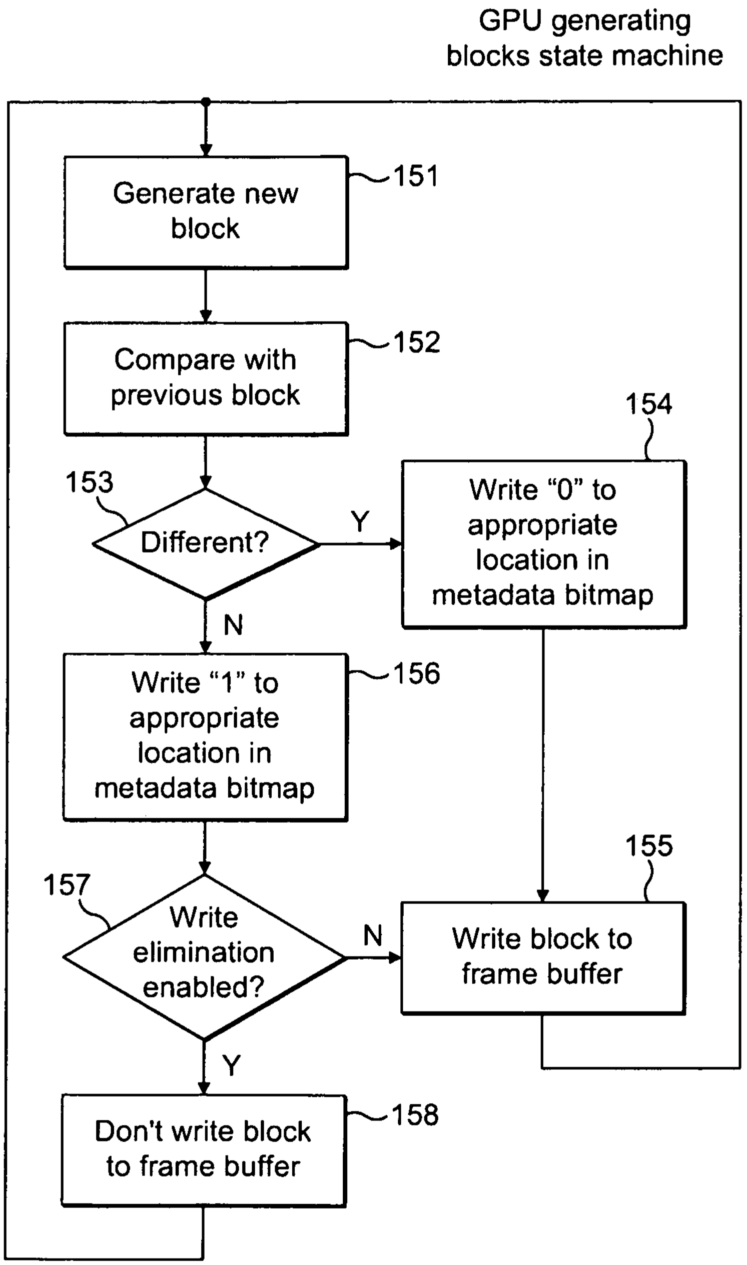

FIGS. 4*a* and 4*b* show schematically possible modifications to the operation of a preferred embodiment of the technology described in this application;

FIG. 5 shows the composition of several image sources to provide an output for display;

FIG. 6 shows schematically an embodiment of the technology described in this application where there are several image sources;

FIG. 7 shows schematically another embodiment of the technology described in this application where there are several image sources;

FIG. 8 shows schematically a further embodiment in which the technology described in this application is used in conjunction with a tile-based graphics processor;

FIG. 9 shows schematically how the relevant data is stored in memory in an embodiment of the technology described in this application;

FIG. 10 shows schematically and in more detail the display controller of the embodiment shown in FIG. 8;

FIG. 11 shows the operation of the display controller in the embodiment shown in FIG. 8;

FIG. 12 shows schematically and in more detail the graphics processor of the embodiment shown in FIG. 8; and FIG. 13 shows the operation of the graphics processor in the embodiment shown in FIG. 8.

A number of preferred embodiments of the technology described in this application will now be described. These embodiments will be described primarily with reference to the use of the technology described in this application in a graphics processing system, although, as noted above, the technology described in this application is applicable to other data processing systems which process data in blocks representing portions of a whole output, such as video processing.

Similarly, the following embodiments will be described primarily with reference to the comparison of rendered tiles generated by a tile-based graphics processor in the manner of the technology described in this application, although again and as noted above, the technology described in this application is not limited to such arrangements.

Figure 1:
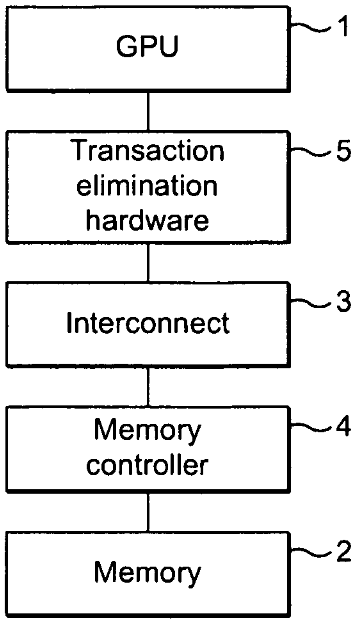
FIG. 1 shows schematically a first embodiment in which the technology described in this application is used in conjunction with a tile-based graphics processor.

FIG. 1 shows schematically an arrangement of a graphics processing system that is in accordance with the technology described in this application.

The graphics processing system includes, as shown in FIG. 1, a tile-based graphics processor or graphics processing unit (GPU) 1, which, as is known in the art, produces tiles of an output data array, such as an output frame to be generated. The output data array may, as is known in the art, typically be an output frame intended for display on a display device, such as a screen or printer, but may also, for example, comprise a "render to texture" output of the graphics processor, etc.

As is known in the art, in such an arrangement, once a tile has been generated by the graphics processor 1, it would then normally be written to the frame buffer in memory 2 (which memory may be DDR-SDRAM) via an interconnect 3 which is connected to a memory controller 4. Sometime later the frame buffer will, e.g., be read by a display controller and output to the display.

In the present embodiment, and in accordance with the technology described in this application, this process is modified by the use of a transaction elimination hardware unit 5, which controls the writing of tiles generated by the graphics processor 1 to the frame buffer in the memory 2. In essence, and as will be discussed in more detail below, the transaction elimination hardware 5 operates to generate for each tile a signature representative of the content of the tile and then compares that signature with the signature of one or more tiles already stored in the frame buffer to see if the signatures match. (Thus, in this embodiment, the data blocks that are compared in the manner of the technology described in this application comprise rendered tiles generated by the graphics processor.)

If the signatures match, it is then assumed that the new tile is the same as the tile already stored in the frame buffer, and so the transaction elimination hardware unit 5 abstains from writing the new tile to the frame buffer.

In this way, the present embodiment can avoid write traffic for sections of the frame buffer that don't actually change from one frame to the next (in the case of a game, this would typically be the case for much of the user interface, the sky, etc., as well as most of the playfield when the camera position is static). This can save a significant amount of bandwidth and power consumption in relation to the frame buffer operation.

On the other hand, if the signatures do not match, then the new tile is written to the frame buffer and the generated signature for the tile is also written to memory.

Figure 2:
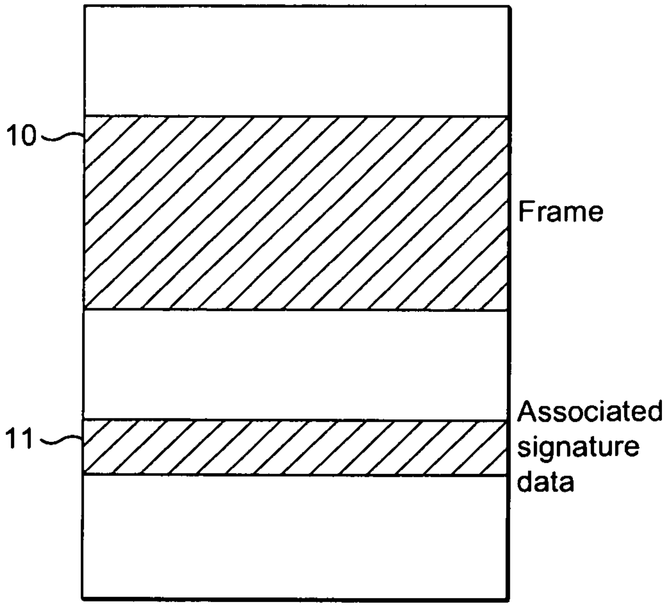
FIG. 2 shows schematically how the relevant data is stored in memory in the first embodiment of the technology described in this application.

FIG. 2 shows an exemplary memory layout for this, in which the tiles making up the frame are stored in one portion 10 of the memory (thus forming the "frame buffer") and the associated signatures for the tiles making up the frame are stored in another portion 11 of the memory. (Other arrangements would, of course, be possible.) For high definition (HD) frames, if one has a 16×16 32-bit tile, then using 32-bit signatures will add 30 KB to an 8 MB frame.

(Where the frame buffer is double-buffered, then preferably signature data is stored for (and with) each frame. A new tile would then be compared with the oldest frame in memory.)

Figure 3:
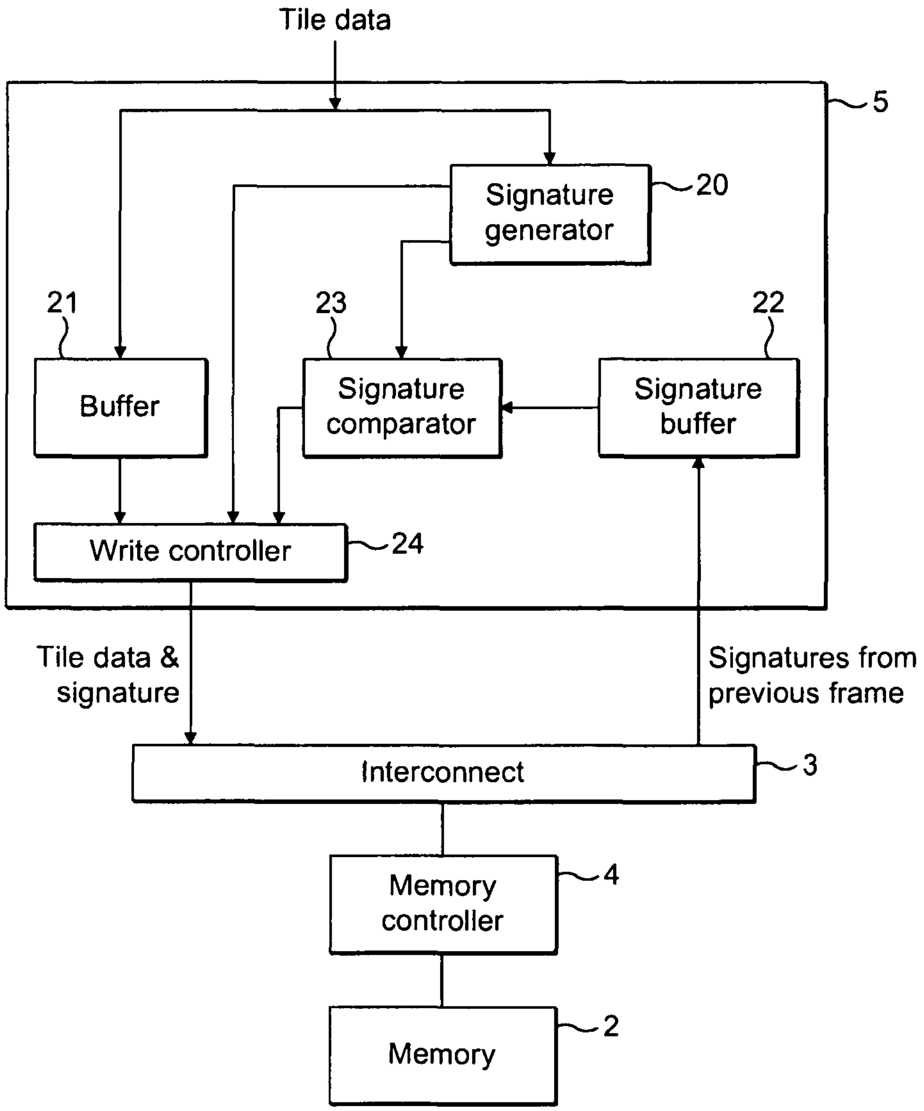
FIG. 3 shows schematically and in more detail the transaction elimination hardware unit of the embodiment shown in FIG. 1.

FIG. 3 shows the transaction elimination hardware unit 5 in more detail.

As shown in FIG. 3, the tile data received by the transaction elimination hardware unit 5 from the graphics processor 1 is passed both to a buffer 21 which temporarily stores the tile data while the signature generation and comparison process takes place, and a signature generator 20.

The signature generator 20 operates to generate the necessary signature for the tile. In the present embodiment the signature is in the form of a 32-bit CRC for the tile.

Other signature generation functions and other forms of signature such as hash functions, etc., could also or instead be used, if desired. It would also, for example, be possible to generate a single signature for an RGBA tile, or a separate signature for each colour plane. Similarly, colour conversion could be performed and a separate signature generated for each of Y, U and V. In order to reduce power consumption, the tile data processed in by the signature generator 20 could be reordered (e.g. using the Hilbert curve), if desired.

Once the signature for the new tile has been generated, it is passed to a signature comparator 23, which operates to compare the signature of the new tile with the signature or signatures of a tile or tiles that is or are already present in the frame buffer. In the present embodiment, the comparison is with the signature of the tile already in the frame buffer at the tile position for the tile in question.

The signatures for plural tiles from the previous frame are cached in a signature buffer 22 (this buffer may be implemented in a number of ways, e.g. buffer or cache) of the transaction elimination hardware unit 5 to facilitate their retrieval in operation of the system, and so the signature comparator 23 fetches the relevant signature from the signature buffer 22 if it is present there (or triggers a fetch of the signature from the main memory 2, as is known in the art), and compares the signature of the previous frame's tile with the signature received from the signature generator to see if there is a match.

If the signatures do not match, then the signature comparator 23 controls a write controller 24 to write the new tile and its signature to the frame buffer and associated signature data store in the memory 2. On the other hand, if the signature comparator finds that the signature of the new tile matches the signature of the tile already stored in the frame buffer, then the write controller 24 invalidates the tile and no data is written to the frame buffer (i.e. the existing tile is allowed to remain in the frame buffer and its signature is retained).

In this way, a tile is only written to the frame buffer in the memory 2 if it is found that by the signature comparison to differ from a tile that is already stored in the memory 2. This helps to reduce the number of write transactions to the memory 2 as a frame is being generated.

In the present embodiment, to stop incorrectly matched tiles from existing for too long a long period of time in the frame buffer, the signature comparison for each stored tile in the frame buffer is periodically disabled (preferably once a second). This then means that when a tile whose signature comparison has been disabled is newly generated, the newly generated tile will inevitably be written to the frame buffer in the memory 2. In this way, it can be ensured that mismatched tiles will over time always be replaced with completely new (and therefore correct) tiles. (With random tiles, a 32-bit CRC, for example, will generate a false match (i.e. a situation where the same signature is generated for tiles having different content) once every 2^32 tiles, which at 1080 HD resolution at 30 frames per second would amount to a tile mismatch due to the comparison process about every 4 hours.)

In the present embodiment, the stored tiles' signature comparisons are disabled in a predetermined, cyclic, sequence, so that each second (and/or over a set of say, 25 or 30 frames), each individual tile will have its signature comparison disabled (and hence a new tile written for it) once.

Other arrangements would be possible. For example, the system could simply be arranged to write out a completely new frame periodically (e.g. once a second), in a similar way to MPEG video. Additionally or alternatively, longer signatures could be used for each tile, as that should then reduce significantly the rate at which any false tile matches due to identical signatures for in fact different tiles occur. For example, a larger CRC such as a 64-bit CRC could reduce such mismatches to once every 1.2 million years.

(Alternatively, as any such false tile matches are unlikely to be perceptible due to the fact that the tiles will in any event still be similar and the mismatched tile is only likely to be displayed for the order of 1/30th of a second or less, it may be decided that no precautions in this regard are necessary.)

It would also be possible to, for example, weight the signature generation to those aspects of a tile's content that are considered to be more important (e.g. in terms of how the user perceives the final displayed tile). For example, a longer signature could be generated for the MSB bits of a colour as compared to the LSB bits of a colour (as in general the LSB bits of a colour are less important than the MSB bits). The length of the signature could also be adapted in use, e.g., depending upon the application, to help minimise power consumption.

In a particularly preferred embodiment, the data block signatures that are generated for use in the technology described in this application are "salted" (i.e. have another number (a salt value) added to the generated signature value) when they are created. The salt value may conveniently be, e.g., the data output array (e.g. frame) number since boot, or a random value. This will, as is known in the art, help to make any error caused by any inaccuracies in the comparison process of the technology described in this application non-deterministic (i.e. avoid, for example, the error always occurring at the same point for repeated viewings of a given sequence of images such as, for example, where the process is being used to display a film or television programme).

As discussed above, in the present embodiment, the signature comparison process operates to compare a newly generated tile with the tile that is stored for the corresponding tile position in the frame buffer.

However, in another preferred embodiment, a given generated tile is compared with multiple tiles already stored in the frame buffer. In this case, the signature generated for the tile will accordingly be compared with the signatures of plural tiles stored in the frame buffer. It is preferred in this case that such comparisons take place with the signatures of the tiles that are stored in the signature buffer 22 of the transaction elimination hardware unit 5 (i.e. with a subset of all the stored tiles for the frame), although other arrangements, such as comparing a new tile with all the stored tiles would be possible if desired. Preferably the tiles are processed in an appropriate order, such as a Hilbert order, in order to increase the likelihood of matches with the tiles whose signatures are stored in the signature buffer 22.

In this case, the signature generated for a new tile will accordingly be compared with the signatures of multiple tiles in the current output frame (which tiles may, as will be appreciated by those skilled in the art, be tiles that have been newly written to the current frame, or tiles from previous frame(s) that have, in effect, been "carried forward" to the present frame because they matched a tile of the present frame).

In this embodiment a list that indicates whether a tile is the same as another tile having a different tile coordinate in the previous frame or not is maintained. Then, on reading a tile to be displayed, the corresponding list entry is read. If the list entry value is null, the data stored in the normal tile position for that tile is read. Otherwise, the list entry will contain the address of a different tile to read, which may, e.g., be automatically translated by the transaction elimination hardware unit 5 to determine the position of the tile in the frame buffer that should be read for the current tile position.

In one preferred embodiment of the technology described in this application, the tile comparison process is carried out for each and every tile that is generated. However, in another preferred embodiment, an adaptive scheme is used where fewer tiles are analysed when there is expected to be little correlation between frames. In this arrangement, the historic number of tile matches is used as a measure of the correlation between the frames (since if there are a lot of tile matches, there can be assumed to be a lot of correlation between frames, and vice-versa). The transaction elimination hardware may include a suitable controller for carrying out this operation.

Thus, in this case, when it is determined that there is a lot of correlation between the frames (i.e. many of the tiles are matched to tiles already present in the frame buffer), then signatures are generated and comparisons carried out for all of the tiles, whereas when it is determined that there is little correlation between frames (such that few or no tiles have been found to match to tiles already stored in the frame buffer), then signatures are generated and the tile comparison process performed for fewer tiles.

FIG. 4 illustrates this. FIG. 4*a* shows the case where there is a lot of correlation between frames and so signatures are generated for all tiles. FIG. 4*b* shows the converse situation where there is little correlation between frames, and so in this case signatures are generated and compared for only a subset 41 of the tiles.

It would also be possible to use these principles to, for example, try to determine which particular portions of the frame have a higher correlation, and then increase the number of tiles that are subject to the comparison in particular regions of the frame only, if desired.

As will be appreciated by those skilled in the art, the transaction elimination hardware unit 5 can operate in respect of any output that the graphics processor 1 is producing, such as the graphics frame buffer, graphics render to texture, etc.

As will be appreciated by those skilled in the art, in a typical system that includes the graphics processor 1, there may be a number of image sources, such as the GUI, graphics and video. These sources may be composited using the display controller using layers, or a special purpose composition engine, or using the graphics processor, for example. FIG. 5 shows an example of such composited frame.

In such arrangements, the transaction elimination process of the technology described in this application could be used for example, in respect of the graphics processor only. FIG. 6 shows a possible system configuration for such an arrangement. In this case, there is a graphics processor 1, a video codec 60, and a CPU 61, each generating potential image sources for display. The transaction elimination unit 5 is arranged intermediate the graphics processor 1 and the memory interconnect 3.

However, the Applicants have recognised that the transaction elimination process of the technology described in this application could equally be used for other forms of data that is processed in blocks in a manner similar to the tiles of a tile-based graphics processor, such as a video processor (video codec) producing video blocks for a video frame buffer, and for graphics processor image composition. Thus the transaction elimination process of the technology described in this application may be applied equally to the image that is being, for example, generated by the video processor 60.

FIG. 7 therefore illustrates an alternative arrangement in which the transaction elimination hardware unit 5 is operable in the manner discussed above to handle appropriate image outputs from any of the graphics processor 1, video processor 60 and a CPU 61. In this arrangement, the transaction elimination hardware unit 5 is enabled to operate for certain master IDs and/or for certain defined and selected portions of the address map.

Other arrangements would, of course, be possible.

It would also be possible to use the technology described in this application where there are, for example, plural masters all writing data blocks to the output buffer. This may be the case, for example, when a host processor generates an "overlay" to be displayed on an image that is being generated by a graphics processor.

In such a case, all of the different master devices may, for example, have their outputs subjected to the data block comparison process. Alternatively, the data block comparison process may be disabled when there are two or more master devices generating data blocks for the output data array, either for the entire output data array, or only for those portions of the output data array where it is possible that two master devices may be generating output data blocks (only e.g., for the region of the output data array where the host processor's "overlay" is to appear).

A number of other alternatives and arrangements of the above embodiments and of the technology described in this application could be used if desired.

For example, it would be possible to provide hardware registers that enable/disable the tile signature calculations for particular frame regions, such that the transaction elimination signature generation and comparison is only performed for a tile if the register for the frame region in which the tile resides is set.

The driver for the graphics processor (for example) could then be configured to allow software applications to access and set these tile signature enable/disable registers, thereby giving the software application the opportunity to control directly whether or not and where (for which frame regions) the signature generation and comparisons take place. This would allow a software application to, for example, control how and whether the signature calculation and comparison is performed. This could then be used, e.g., to eliminate the power consumed by the signature calculation for a region of the output frame the application "knows" will be always updated (with the system then always updating such regions of the frame without performing any signature check first).

The number of such registers may chosen, for example, as a trade-off between the extra logic required implementing and using them and the desired granularity of control.

It would also be possible to further exploit the fact that, as discussed above, the number of tile matches in a frame can be used as a measure of the correlation between successive frames. For example, by using a counter to keep track of the number of tile matches in a given frame, it could be determined whether or not the image is static as between successive frames and/or for a period of time. If it is thereby determined that the image is static for a period of time, then, for example, the processor frame rate could be reduced (thereby saving power), the display refresh rate could be reduced, and/or the frame could be re-rendered using better anti-aliasing (thereby increasing the (perceived) image quality), and vice-versa.

The present arrangement also can be used in conjunction with other frame buffer power and bandwidth reduction techniques, such as frame-buffer compression. In this case, the write transaction elimination in the manner of the technology described in this application is preferably performed first, before the compression (or other) operation is carried out. Then, if the comparison process finds that the tiles' signatures are the same, the previous compressed tile can then be retained as the tile to use in the current output frame, but if the tile is not "eliminated", then the new tile will be sent to the frame-buffer compression (or other) hardware and then on to the frame buffer in memory. This then means that if the tiles' signatures match, the compression operation can be avoided.

Although the present embodiment has been described above with particular reference to the comparison of rendered tiles to be written to the frame buffer, as discussed herein, it is not necessary that the data blocks forming regions of the output data array that are compared (and e.g. have signatures generated for them) in the manner of the technology described in this application correspond exactly to rendered tiles generated by the graphics processor.

For example, the data blocks that are considered and compared in the manner of the technology described in this application could be made up of plural rendered tiles and/or could comprise sub-portions of a rendered tile. Indeed, different data block sizes may be used for different regions of the same output array (e.g. output frame) and/or the data block size and shape could be adaptively changed, e.g. depending upon the write transaction elimination rate, if desired.

Where a data block size that does not correspond exactly to the size of a rendered tile is being used, then the transaction elimination hardware unit 5 may conveniently be configured to, in effect, assemble or generate the appropriate data blocks (and, e.g., signatures for those data blocks) from the data, such as the rendered tiles, that it receives from the graphics processor (or other processor providing it data for an output array).

Further preferred embodiments of the technology described in this application will now be described. These embodiments will be described primarily with reference to the processing of an image generated by a graphics processing system for display by a display controller, although, as noted above, the technology described in this application is applicable to other arrangements in which a data array is processed in blocks representing regions of the overall array.

FIG. 8 shows schematically an arrangement of a system that can be operated in accordance with the present embodiment.

The system includes, as shown in FIG. 8, a tile-based graphics processor (GPU) 101. This is the element of the system that, in this embodiment, generates the data arrays to be processed. The data arrays may, as is known in the art, typically be output frames intended for display on a display device 102, such as a screen or printer but may also, for example, comprise a "render to texture" output of the graphics processor 101, etc.

The graphics processor, as is known in the art, generates output data arrays, such as output frames, to be processed, by generating tiles representing different regions of a respective output data array.

As is known in the art, in such an arrangement, once a tile has been generated by the graphics processor 101 it would then normally be written to an output buffer in the form of a frame buffer 103 in main memory 104 (which memory may be DDR-SDRAM) of the system via an interconnect 105 which is connected to a memory controller 106.

Sometime later the data array in the frame buffer 103 will be read by a display controller 107 and output to the display device 102. (Thus the display controller 107 is the processing device that is to process the data array that is generated by the graphics processor 101 (in this case to display it).)

As part of this process, the display controller will read blocks of data from the frame buffer 103 and store them in a local memory buffer 108 of the display controller 107 before outputting those blocks of data to the display 102. The display device 102 may, e.g., be a screen or printer.

In the present embodiment this process further comprises the display controller 107 determining whether a new block of data to be output (processed) for display is to be considered to be similar to a block of data already stored in the local memory 108 of the display controller 107 or not. To do this, in the present embodiment the display controller 107 uses similarity meta-data associated with the output frame in the frame buffer that has been generated by the graphics processor 101 when it generated the output frame. (This process is discussed in more detail below.)

In essence, and as will be discussed in more detail below, the display controller 107 determines whether a data block to be processed is to be considered to be similar to a data block already stored in its local buffer 108, and if it is found that the data block to be processed is similar to a data block already stored in the local buffer 108 of the display controller 107, the display controller does not read a new data block from the frame buffer 103 but instead provides the existing data block in its buffer 108 to the display 102.

In this way, the present embodiment can avoid read traffic between the display controller 107 and the frame buffer 103 for blocks of data in the frame buffer 103 that are similar to blocks of data that are already stored in the local buffer 108 of the display controller 107. (In the case of a game, for example, this may typically be the case for much of the user interface, the sky, etc., as well as most of the playfield when the camera position is static.) This can save a significant amount of bandwidth and power consumption in relation to the frame read operation.

On the other hand, if a data block to be processed is determined not to be similar to a data block already stored in local buffer 108 of the display controller 107, then the display controller reads a new data block from the frame buffer 103 into its local buffer 108 and then provides that new data block to the display 102.

In the present embodiment the data blocks that are read from the frame buffer 103 and compared to data blocks already stored in the buffer 108 of the display controller 107 comprise cache lines, as that is the amount of data that is read for each reading operation by the display controller 107 from the frame buffer 103. However, other arrangements would be possible. For example, the display controller could operate this process in respect of data blocks that correspond to the rendered tiles that the graphics processor 101 generates, or to 2D "sub-tiles" of the rendered tiles.

FIG. 8 also shows a host CPU 109 that is also capable of interacting with the main memory 104 via the interconnect 105 and which can also, for example, write to the frame buffer 103 in the main memory 104. This possibility will be discussed in more detail below.

In the present embodiment, as discussed above, the display controller 107 determines whether a given data block (cache line) to be processed for display is to be considered to be similar to a data block already stored in its local buffer 108 by assessing metadata in the form of a bitmap that is stored in association with the data blocks making up the frame in question.

Each data block position (cache line) in the stored data array in the frame buffer 103 has associated with it a single bit in a bitmap that corresponds to the frame (with each bit in the bitmap corresponding to one data block position (cache line in this case) of the frame). The bit in the bitmap for a data block (cache line) is set to "1" if the data block is to be considered to be the same as the previous data block (cache line) to be read (processed) from the frame or set to "0" if the data block is considered to be different to the previous data block.

In this way, the display controller can read the bitmap entry associated with a data block that it is due to process, and if that bitmap entry is set to "1", will know that that data block is to be considered the same as a previous data block that was read into the buffer 108 of the display controller 107 (and so can display that data block that is already in its buffer 108 instead of reading a new data block into the local memory 108 of the display controller 107). Alternatively, if the metadata associated with the data block to be processed is "0", the display controller knows that it should read a new data block from the frame buffer 103 into its local buffer 108 and then display it on the display 102.

FIG. 9 shows an exemplary memory layout for the data array in the frame buffer 103 and its associated metadata (data block similarity information) 110. In this case, the data blocks making up the frame are stored as a frame buffer 103 and the associated data block similarity bitmap 110 is stored in another portion of the memory 104. (Other arrangements would, of course, be possible.)

As shown in FIG. 9, each data block in the data array in the frame buffer 103 has an associated entry in the similarity information bitmap 110. Thus, for example, data block 111 in the frame buffer 103 is associated with bitmap entry 113 in the bitmap 110 and data block 112 in the frame buffer 103 is associated with bitmap entry 114 in the similarity bitmap 110.

FIG. 9 also shows the nature of the bitmap entries. Thus bitmap entry 113 has the value "0" to indicate that the data block 111 in the data array in the frame buffer 103 is not the same as the previous data block (and so a "new" data block that should be read from the frame buffer into the local memory 108 of the display controller 107). On the other hand, bitmap entry 114 for the next data block 112 has the entry "1" to indicate that that data block 112 is the same as data block 111 in the frame buffer 103. This will then cause the display controller to display the data block 111 that is stored in its local memory 108 instead of reading the new data block 112 from the frame buffer 103.

Other similarity metadata arrangements could be used if desired. For example, each data block could potentially be indicated as being similar to more than one data block in the data array, in which case each bitmap entry could comprise more bits so as to indicate to the display controller 107 which of the data blocks in the data array the data block to which the bitmap entry corresponds is to be considered to be similar to. In these arrangements, each similarity value (meta-data entry) can, e.g., give a relative indication of which other data block in the data array the data block in question is similar to (such that, e.g., "001" indicates the previous data block relative to the current data block), or an absolute indication of which other data block in the data array the data block in question is similar to (such that, e.g., meta-data "125" indicates the block is similar to the 125th data block in the data array in question).

It would also be possible to include with each meta-data entry a "likeness" value that indicates how similar the respective data blocks are. The similarity determination process could then, e.g., use this likeness value to determine whether to read a new block from the data array or to re-use the already existing similar data block in the local memory of the processing device in use. For example, the similarity determination process could set a likeness value threshold, and compare the likeness value for a new data block to that threshold and read in the new data block or not, accordingly.

It would also be possible to use arrangements other than bitmaps, such as hierarchical quad trees, etc. The meta-data (similarity information) that is associated with the data array could also be in the form of a command list that instructs the processing device to read the data blocks into the local memory of the processing device according to their relative similarities.

Also as will be discussed further below, although in the above bitmap example the similarity metadata (bitmap) indicates directly to the display controller 107 whether a respective data block should be considered to be similar to another data block in the data array or not, it would also be possible to associate with each data block some information which allows the display controller itself to carry out a comparison between the data blocks so as to determine whether they should be considered to be similar or not. For example, it would be possible to store instead information representative of the content of each data block and for the display controller 107 to then compare the respective content information of the data blocks to determine if they should be considered to be similar or not.

FIG. 10 shows the structure of the display controller 107 in more detail and FIG. 11 is a flowchart showing the above operation of the display controller 107.

As shown in FIG. 10, the display controller 107 includes a bus interface unit 120, a metadata buffer 121, a display formatter and output unit 122, and a state machine controller 123, in addition to the local buffer 108 in which it stores the data blocks from the frame buffer 103 in main memory 104 before they are displayed.

The state machine controller 123 acts to control the display controller 107 to execute the operation of the embodiment described above. The metadata buffer 121 is used to store chunks of the metadata bitmap 110 for the frame (data array) in question, to improve off-chip memory access efficiency. Other arrangements, such as the display controller always reading the metadata in the main memory 104 directly would be possible.

When a new frame is to be displayed, the display controller will first read an appropriate portion of the metadata 110 associated with that frame from the main memory 104 and store it in its metadata buffer 121. The display controller will then read blocks of data from the frame buffer 103 in main memory 104 into its data cache/buffer 108 and provide those blocks of data appropriately via the display formatter/output unit 122 to the display 102 for display. The display controller operates to pre-fetch the blocks of data to be displayed into its local memory 108. This is so as to ensure that there is always data available to be displayed (as buffer/memory under-runs could result in the displayed image glitching). The blocks are then read from the local memory 108 one after another for display. However, this operation is modified under the control of the state machine 123 to follow the process shown in FIG. 11 (and discussed above).

As shown in FIG. 11, when a new data block (cache line) is to be pre-fetched into the local memory 108, in order to be processed for display (which may be triggered, e.g., by the display of a block from the local memory 108, thereby prompting the need to fetch a new block to add to the "queue" in the local memory 108), the state machine controller 123 reads the appropriate location in the similarity metadata bitmap in the metadata buffer 121 for that new data block (step 131). It then determines whether the bit stored in the appropriate location in the similarity bitmap has the value "1" or not (step 132).

If it is determined that the value in the bitmap location is "1", then that indicates that the new data block is the same as the previous data block (which should therefore already be in the local memory 108 of the display controller) and so instead of reading a new data block from the frame buffer 103, the state machine controller 123 causes the display controller to (at the appropriate time) use the previous data block that is already in its local buffer 108, i.e. to provide that previous data block from the local buffer 108 to the display 102 (step 133). (It will be appreciated here that if there is a sequence of similar blocks (i.e. blocks for which the meta-data has the value "1"), then the state machine controller will cause the display controller to, in effect, reuse (repeat) the first block in the sequence for each successive similar data block.)

On the other hand, if the value in the bitmap is "0", then that indicates that the data block is not the same as the previous data block and so the data block will need to be pre-fetched from the frame buffer 103 into the local memory 108 for display. In this case the state machine controller 123 causes the display controller to read the data block from the frame buffer 103 in the main memory 104 (step 134) and to store that data block in the local buffer 108 of the display controller (step 135). The new block is then provided (at the appropriate time) from the local buffer 108 of the display controller 107 to the display device 102 (step 136).

The data block is then displayed (step 137).

The process is then repeated for the next data block to be processed (to be pre-fetched into the local memory 108) and so on.

In the present embodiment, the metadata that is used by the display controller 107 to determine whether or not a new block to be processed is the same as a data block already stored in its local buffer 108 is generated by the graphics processor 101 as the tiles making up the frame are generated. FIG. 12 shows the architecture of the graphics processor 101 that carries out this process and FIG. 13 is a flow diagram showing the steps of the metadata generating process.

As shown in FIG. 12, the graphics processor 101 is modified to include after its tile rendering logic 140, additional data block generation logic and block comparison logic which is used to generate the appropriate metadata for association with the data array (frame) in the frame buffer 103.

The block generating logic 141 acts to generate the appropriate data blocks from the tiles that are generated by the tile rendering logic 140. In the present embodiment the block generating logic accordingly generates blocks that correspond to cache lines in the cache memory 108 of the display controller 107. However, as discussed above, other sizes and forms of data block would be possible and could be generated by the block generating logic 141 if desired.

The block generating logic stores the successive blocks that it generates in buffers 142. Comparison logic 143 then compares respective data blocks that are stored in the buffers 142 (in this case a new data block with the immediately preceding data block), and generates an appropriate metadata output bit on the basis of the comparison. To increase memory efficiency, the meta-data output bits for plural blocks are collected and merged in a buffer, and then stored appropriately in the metadata bitmap 110 in the main memory 104 (written to off-chip memory). (Other arrangements would, of course, be possible.) The data blocks are also read from the buffers 142 and stored appropriately in the frame buffer 103.

To facilitate this operation, the data blocks making up the output frame are processed in a particular, predefined order (both for writing them to the frame buffer and reading them therefrom). An order that can exploit any spatial coherence between the blocks is preferably used.

This process is shown as a flowchart in FIG. 13.

As shown in FIG. 13, the block generation logic 141 generates data blocks (in this case corresponding to cache lines) from the rendered tiles produced by the tile rendering logic 140 (step 151). The data blocks are then stored in the buffers 142.

The comparison logic 143 then compares a new data block with the previous data block (which will already be stored in the buffers 142) (step 152). In the present embodiment, the comparison logic 143 compares the content of the data blocks with each other. Other arrangements would be possible. For example, the comparison logic could generate a signature, such as 32-bit CRC, for each block in question, to represent the content of the blocks, and then compare the signatures of the blocks rather than the actual content of the blocks.

The comparison logic then determines whether the new block should be considered to be similar to the previous block or not (step 153). In the present embodiment this assessment is based on how similar the contents of the two blocks being compared are. A threshold of a particular amount of differences in the LSBs of the pixels is set, and if the difference between the content of the two blocks is less than this threshold, the blocks are determined to be similar, and vice-versa.

(This threshold can be varied (e.g. programmed) in use. It could, for example, be set per application, based on the proportion of static and dynamic frame data, and/or based on the power mode (e.g. low power mode or not) in use, etc.)

If the blocks are determined to be different (i.e. not to be similar) by the comparison logic in step 153, then the comparison logic operates to write the value "0" into the appropriate location in the meta-data bitmap 110 (step 154). The new data block is itself written from the buffers 142 to the frame buffer 103 in the main memory 104 (step 155).

On the other hand, if at step 153 it is determined that the blocks should be considered to be similar, then the comparison logic 143 operates to causes a "1" to be written into the appropriate location in the meta-data bitmap 110 (step 156).

It would then be possible again simply to write the new block into the frame buffer 103 in the main memory 104 as was the case where the blocks were considered to be different. However, FIG. 13 shows a preferred arrangement in which a possible "write elimination" operation may be enabled in the graphics processor 101. This write elimination process operates, as will be discussed further below, to allow the graphics processor to avoid writing blocks that are determined to be similar to each other into the data array in the frame buffer 103. Thus, as shown in FIG. 13, if the write elimination process is enabled (step 157), then in the case that, the two blocks are considered to be similar to each other, the new block is not written into the data array in the frame buffer (step 158). (On the other hand, if the write elimination process is not enabled at step 157, then the new block would be written to the frame buffer as normal (step 155).)

The write elimination process in step 157 thus operates such that if a data block is determined to be the same as the previous data block (i.e. it is the same as the data block that will have already been stored in the frame buffer 103), then the new data block is not written into the frame buffer as well. In this way, the write elimination process can avoid write traffic for sections of the data array (frame buffer) that are the same as each other. This can further save bandwidth and power consumption in relation to the frame buffer operation. On the other hand, if the data blocks are determined to be different, then the new data block is written to the frame buffer as would be the case without the write elimination process.

In these arrangements, although the data blocks themselves may not be written to the data array, the similarity meta-data should still be generated and stored for the block position in question, as the processing device (the display controller in the present embodiment) will still need to use that information to determine which other block should be processed instead.

In a particularly preferred arrangement of these embodiments, where the data block comparisons may not be exact (may erroneously match blocks that do in fact differ) the system is configured to always write a newly generated data block to the frame buffer periodically, e.g., once a second, in respect of each given data block (data block position). This will then ensure that a new data block is written into the frame buffer at least periodically for every data block position, and thereby avoid, e.g., erroneously matched data blocks being retained in the frame buffer for more than a given, e.g. desired or selected, period of time. This may be done, e.g., by simply writing out an entire new output data array periodically (e.g. once a second), or by writing new data blocks out to the frame buffer on a rolling basis in a cyclic pattern, so that over time all the data block positions are eventually written out as new.

Various alternatives and modifications to the above arrangements would be possible. For example, the output array of data that the graphics processor is generating may also or instead comprise other outputs of a graphics processor such as a graphics texture (where, e.g., the render "target" is a texture that the graphics processor is being used to generate (e.g. in "render to texture" operation)) or other surface to which the output of the graphics processor system is to be written.

It would be possible to use a more sophisticated metadata arrangement, for example where data blocks are not just compared to their immediately preceding data block but to more than one data block in the output frame (data array). In this case the metadata (e.g. bitmap entry) associated with each respective block position should indicate not only that the corresponding data block is similar to another data block in the output data array but also which data block in the output data array it is similar to.

Similarly, the current, completed data block could be compared to plural data blocks that are in the data array. This may help to further reduce the number of data blocks that need to be read from the main memory for the processing, as it will allow the reading of data blocks that are similar to data blocks in other positions in the data array to be eliminated.

In a preferred embodiment, it is possible for a software application (e.g. that is triggering the generation of the data array, and/or that is to use and/or receive the output array that is being generated) to indicate and control which regions of the output data array are processed in the manner of the present embodiment, and in particular, and preferably, to indicate which regions of the output array the data block comparison process should be performed for. This would then allow the process of the technology described in this application to be "turned off" by the application for regions of the output array the application "knows" will be always updated.

This may be achieved as desired. In a preferred embodiment registers are provided that enable/disable data block (e.g. rendered tile) comparisons for output array regions, and the software application then sets the registers accordingly (e.g. via the graphics processor driver).

Although the present embodiment has been described above with particular reference to graphics processor operation, the Applicants have recognised that the principles of the technology described in this application can equally be applied to other systems that process data in the form of blocks in a similar manner to, e.g., tile-based graphics processing systems, and that, for example, read frame buffers or textures. Thus, it may, for example, be applied to a host processor manipulating the frame buffer, a graphics processor reading a texture, a composition engine reading images to be composited, or a video processor reading reference frames for video decoding. Thus the techniques of the embodiment may equally be used, for example, for video processing (as video processing operates on blocks of data analogous to tiles in graphics processing), and for composite image processing (as again the composition frame buffer will be processed as distinct blocks of data).

They may also be used, for example, when processing the data (images) generated by (digital) cameras (video or still). In this case, the data from the camera's sensor, could, e.g., be processed as discussed above by the camera's controller to generate the appropriate meta-data for the image data that is written to memory (and to control the writing of the image data if desired). The so-stored image and meta-data could then be processed in the manner of the technology described in this application by an, e.g., display controller that is to display the images from the camera.

The present embodiment may also be used where there are plural master devices each writing to the same output data array, e.g., frame in a frame buffer. This may be the case, for example, when a host processor 9 generates an "overlay" to be displayed on an image that is being generated by the graphics processor 1.

In this case, each device writing to the output data array could update the similarity meta-data accordingly, or, e.g., the meta-data for those parts of the output array that another master is writing to could be invalidated or cleared (so that those parts of the output array will be read out in full to the output device). The latter would be necessary where a given master device is unable to update the similarity meta-data. It would also be possible to invalidate (clear) the meta-data for the entire output array if, e.g., another master modifies a relatively large portion of the output array (or modifies the output array at all).

Various other preferred and alternative arrangements of the present embodiment are possible.

For example, the metadata may also be used to manage the storing of the data blocks in the local memory 108 of the display controller 107 and in particular as a factor in determining the eviction of data blocks from the local memory 108. For example, the metadata may be used to determine a data block or blocks that is going to be used repeatedly and that data block (or blocks) then be locked (for the time being) in the local memory of the processing device (once it is written there) so that it will be available in the local memory when it is needed in the future.

It would also be possible to keep a count of the number of times a given data block in the local memory 108 is to be used in the near future (based, e.g., on meta-data that has been pre-fetched for the portion of the output array that is being processed), and to only allow a data block to be evicted from the local memory when its "use" count is zero.

It can be seen from the above that the technology described in this application, in its preferred embodiments at least, can help to reduce, for example, graphics processor power consumption and memory bandwidth.

This is achieved, in the preferred embodiments of the technology described in this application at least, by eliminating unnecessary frame-buffer memory transactions. This reduces the amount of data that is rendered to the frame buffer, thereby significantly reducing system power consumption and the amount of memory bandwidth consumed. It can be applied to graphics frame buffer, graphics render to texture, video frame buffer and composition frame buffer transactions, etc.

The Applicants have found that for graphics and video operation, transaction reduction rates are likely to be between 0 and 30%. (Analysis of some common games, such as Quake 4 and Doom 3, has shown that between 0 and 30% of the tiles in each frame may typically be the same.) For composition frame buffer operation, transaction elimination rates are believed likely to be very high (greater than 90%), as most of the time only the mouse pointer moves.

The power savings when using the technology described in this application can be relatively significant.

For example, a 32-bit mobile DDR-SDRAM transfer may consume about 2.4 nJ per 32-bit transfer. Thus assuming a graphics processor frame output rate of 30 Hz, and considering first order effects only, graphics processor frame buffer writes will (absent the technology described in this application) consume about (1920×1080×4)×(2.4 nJ/4)×30=150 mW for HD graphics.

On the other hand, if one is able to eliminate 20% of the frame buffer traffic for HD graphics, that would save around 30 mW (and 50 MB/s). For HD composition frame buffer, removing 90% of the frame buffer traffic would save 135 mW (and 220 MB/s).

It can also be seen from the above that the technology described in this application, in its preferred embodiments at least, can help to reduce, for example, display controller power consumption and memory bandwidth.

This is achieved, in the preferred embodiments of the technology described in this application at least, by eliminating unnecessary "main" memory read transactions. This reduces the amount of data that is read from main memory, thereby significantly reducing system power consumption and the amount of memory bandwidth consumed. It can be applied to graphics frame buffer, graphics render to texture, video frame buffer and composition frame buffer read transactions, etc.

The power and bandwidth savings when using the technology described in this application can be relatively significant. For example, for a game and video content, with a standard definition frame buffer, using 32 byte linear blocks, where the previous 4 blocks are analysed (requiring a multi-bit bitmap), the applicants have found that about 17% of read and write transactions can be eliminated. For high definition frame buffers the elimination rate is even higher. For GUI content with a similar configuration about 80% of frame buffer read and write transactions can be eliminated.

Where both reads and writes are eliminated for HD (1920×1080×24 bpp), with 60 fps frame display rate (read) and 30 fps frame update rate (write) and assuming 2.4 nJ per 32-bit off-chip transfer this equates to a bandwidth saving of about 90 MB/s and a power saving of 57 mW for game and video content. For GUI content the savings are 427 MB/s and 268 mW.

So far as the additional overhead due to the need to store meta-data in the technology described in this application is concerned, for a system where only the preceding data block is analysed (i.e. the meta-data comprises a single bit per data block position), a high definition frame using data blocks corresponding to 32 byte cache lines has been found to result in an additional 32 KB of control data for an HD frame occupying 7.9 MB. If using data blocks corresponding to 64 byte tile lines, the control data is 16 KB. For data blocks corresponding to 512 byte half tiles it is 2 KB, and for data blocks corresponding to 1024 byte tiles, it is 1 KB.

The invention claimed is:

1. A method of processing an array of data, comprising:

reading blocks of data representing particular regions of an array of data from a first memory in which the array of data is stored and storing them in a memory of a processing device which is to process the array of data by processing successive blocks of data, each representing particular regions of the array of data, prior to the blocks of data being processed by the processing device; and determining whether a block of data to be processed for the data array is similar to a block of data that is already stored in the memory of the processing device, the block of data that is already stored being a block of data from the same array as the block of data to be processed and for a position in the data array that is different from the block of data to be processed, and either processing for the block of data to be processed the block of data that is already stored in the memory of the processing device, or a new block of data from the array of data stored in the first memory, on the basis of the similarity determination.

2. The method of claim 1, wherein the step of determining whether a block of data to be processed for the data array is similar to a block of data that is already stored in the memory of the processing device, and either processing for the block of data to be processed a block of data that is already stored in the memory of the processing device, or a new block of data from the array of data stored in the first memory, on the basis of the similarity determination, comprises:

if it is determined that a block of data to be processed is to be considered to be similar to a block of data already stored in the memory of the processing device, not reading a new block of data from the data array stored in the first memory and storing it in the memory of the processing device, but instead processing the existing block of data in the memory of the processing device as the block of data to be processed by the processing device; and if it is determined that a block of data to be processed is not to be considered to be similar to a block of data already stored in the memory of the processing device, reading a new block of data from the data array stored in the first memory and storing it in the memory of the processing device, and then processing that new block of data as the block of data to be processed by the processing device.

3. The method of claim 1, wherein the processing device is one of a display controller, a CPU, a video processor and a graphics processor.

4. The method of claim 1, wherein the similarity determination process determines whether a data block to be processed is similar to a block that is already stored in the memory of the processing device using similarity information that is associated with the array of data.

5. The method of claim 1, wherein the data array has associated with it similarity information indicating for each respective data block in the data array whether that data block is similar to another data block in the data array, and the similarity determination process determines whether a data block to be processed is similar to a data block that is already stored in the memory of the processing device using the relevant similarity information for the data block.

6. The method of claim 1, further comprising:

generating an array of data to be processed;

for each of one or more blocks of data representing particular regions of the array of data to be processed:

determining whether the block of data is to be considered to be similar to another block of data for the data array; and generating similarity information indicating whether the block of data was determined to be similar to another block of data for the data array;

storing the array of data and its associated generated similarity information; and using the similarity information generated for the data array to determine whether a block of data to be processed for the data array is similar to a block of data that is already stored in the memory of the processing device.

7. The method of claim 1, wherein the array of data is data representing an image.

8. The method of claim 1, wherein the blocks of data that are considered each comprise a cache line or a 2D sub-tile of the data array.

9. A method of generating meta-data for use when processing an array of data that is stored in memory, the method comprising:

for each of one or more blocks of data representing particular regions of an array of data to be processed:

determining whether the block of data is to be considered to be similar to another block of data for the data array, wherein the another block of data is from the same data array as the block of data and for a position in the data array that is different from the block of data;

generating similarity information indicating whether the block of data was determined to be similar to another block of data for the data array; and storing the similarity information indicating whether the block of data was determined to be similar to another block of data for the data array in association with the array of data.

10. The method of claim 9, wherein the step of determining whether the block of data is to be considered to be similar to another block of data for the data array comprises comparing at least some of the actual content of the data blocks to determine if the data blocks are to be considered to be similar or not.

11. The method of claim 9, further comprising:

not writing a data block to the data array in memory if it has been determined that that data block is to be considered to be similar to another data block for the data array.

12. A system comprising:

a first memory that stores an array of data to be processed;

a processing device that processes the array of data stored in the first memory, by processing successive blocks of data, each representing particular regions of the array of data, the processing device having a memory;

a read controller configured to read blocks of data representing particular regions of the array of data that is stored in the first memory and to store the blocks of data in the memory of the processing device prior to the blocks of data being processed by the processing device; and a controller configured to determine whether a block of data to be processed for the data array is similar to a block of data that is already stored in the memory of the processing device, the block of data that is already stored being a block of data from the same data array as the block of data to be processed and for a position in the data array that is different from the block of data to be processed, and to cause the processing device to process for the block of data to be processed either the block of data that is already stored in the memory of the processing device, or a new block of data from the array of data stored in the first memory, on the basis of the similarity determination.

13. The system of claim 12, wherein the read controller and controller are part of the processing device.

14. The system of claim 12, wherein the controller is configured to:

if it is determined that a block of data to be processed is to be considered to be similar to a block of data already stored in the local memory of the processing device, cause the read controller to not read a new block of data from the data array stored in the first memory and store it in the memory of the processing device, and to cause the processing device to process the existing block of data in the memory of the processing device as the block of data to be processed by the processing device; and if it is determined that a block of data to be processed is not to be considered to be similar to a block of data already stored in the memory of the processing device, cause the read controller to read a new block of data from the data array stored in the first memory and store it in the memory of the processing device, and to cause the processing device to then process that new block of data as the block of data to be processed by the processing device.

15. The system of claim 12, wherein the processing device is one of a display controller, a CPU, a video processor and a graphics processor.

16. The system of claim 12, wherein the controller determines whether a data block to be processed is similar to a block that is already stored in the memory of the processing device using similarity information that is associated with the array of data.

17. The system of claim 12, wherein the data array has associated with it similarity information indicating for each respective data block of the data array whether that data block is similar to another data block in the data array, and the controller determines whether a data block to be processed is similar to a data block that is already stored in the memory of the processing device using the relevant similarity information for the that data block.

18. The system of claim 12, wherein the array of data is data representing an image.

19. The system of claim 12, wherein the blocks of data that are considered each comprise a cache line or a 2D sub-tile of the data array.

20. A data processing system, comprising:

a data processor that generates an array of data for processing; and a processor that:

determines for each of one or more blocks of data representing particular regions of the array of data whether the block of data is to be considered to be similar to another block of data for the data array, wherein the another block of data is from the same data array as the block of data and for a position in the data array that is data array from the block of data, generates similarity information indicating whether the block of data was determined to be similar to another block of data for the data array, and stores the similarity information indicating whether a block of data was determined to be similar to another block of data for the data array in association with the array of data.

21. The system of claim 20, wherein the processor that determines for each of one or more blocks of data representing particular regions of the array of data whether the block of data is to be considered to be similar to another block of data for the data array, generates similarity information indicating whether the block of data was determined to be similar to another block of data for the data array, and stores the similarity information indicating whether a block of data was determined to be similar to another block of data for the data array in association with the array of data, is part of the data processor.

22. The system of claim 20, wherein the data processor is one of a camera controller, a graphics processor, a CPU and a video processor.

23. The system of claim 20, wherein the processor determines whether the block of data should be considered to be similar to another block of data for the data array by comparing at least some of the actual content of the data blocks to determine if the data blocks are to be considered to be similar or not.

24. The system of claim 20, further comprising:

a processing device for processing the stored array of data, by processing successive blocks of data, each representing particular regions of the array of data, the processing device having a local memory;

a read controller configured to read blocks of data representing particular regions of the array of data from the stored array of data and to store the blocks of data in the local memory of the processing device prior to the blocks of data being processed by the processing device; and a controller configured to use the similarity information generated for the data array to determine whether a block of data to be processed for the data array is similar to a block of data that is already stored in the memory of the processing device, and to cause the processing device to process for the block of data to be processed either the block of data that is already stored in the memory of the processing device, or a new block of data from the array of data stored in the first memory, on the basis of the similarity determination.

25. The system of claim 20, wherein:

the processor operates to not write a data block to the data array in memory if it determines that that data block should be considered to be similar to another data block for the data array.

26. One or more non-transitory computer readable storage devices having computer readable code embodied on the computer readable storage devices, the computer readable code for programming one or more data processors to perform a method of processing an array of data, comprising:

reading blocks of data representing particular regions of an array of data from a first memory in which the array of data is stored and storing them in a memory of a processing device which is to process the array of data by processing successive blocks of data, each representing particular regions of the array of data, prior to the blocks of data being processed by the processing device; and further comprising:

determining whether a block of data to be processed for the data array is similar to a block of data that is already stored in the memory of the processing device, the block of data that is already stored being a block of data from the same data array as the block of data to be processed and for a position in the data array that is different from the block of data to be processed, and either processing for the block of data to be processed the block of data that is already stored in the memory of the processing device, or a new block of data from the array of data stored in the first memory, on the basis of the similarity determination.

27. One or more non-transitory computer readable storage devices having computer readable code embodied on the computer readable storage devices, the computer readable code for programming one or more data processors to perform a method of generating meta-data for use when processing an array of data that is stored in memory, the method comprising:

for each of one or more blocks of data representing particular regions of an array of data to be processed:

determining whether the block of data is to be considered to be similar to another block of data for the data array, wherein the another block of data is from the same data array as the block of data and for a position in the data array that is different from the block of data;

generating similarity information indicating whether the block of data was determined to be similar to another block of data for the data array; and storing the similarity information indicating whether the block of data was determined to be similar to another block of data for the data array in association with the array of data.

* * * * *